US006313838B1

(12) United States Patent
Deering

(10) Patent No.: US 6,313,838 B1
(45) Date of Patent: Nov. 6, 2001

(54) ESTIMATING GRAPHICS SYSTEM PERFORMANCE FOR POLYGONS

(75) Inventor: Michael F. Deering, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/250,980

(22) Filed: Feb. 16, 1999

Related U.S. Application Data

(60) Provisional application No. 60/074,838, filed on Feb. 17, 1998.

(51) Int. Cl.$^7$ .................................................. G06T 17/00
(52) U.S. Cl. ............................................ 345/420; 345/428
(58) Field of Search ................................... 345/428, 473, 345/420

(56) References Cited

U.S. PATENT DOCUMENTS

| 5,999,187 | * | 1/1999 | Dehmlow et al. .................. 345/420 |
| 6,072,498 | * | 6/2000 | Brittain et al. ....................... 345/428 |

FOREIGN PATENT DOCUMENTS

| 0 241 091 | 10/1987 | (EP) . |
| 0 463 700 | 1/1992 | (EP) . |
| 0 821 319 | 1/1998 | (EP) . |
| 98/00811 | 1/1998 | (WO) . |

OTHER PUBLICATIONS

International Search Report for Application No. PCT/US99/03227 mailed Jul. 6, 1999.
Patent Abstracts of Japan for Publication No. 10000825, Publication Date Jan. 6, 1998.

"Video Performance Analysis Tool," IBM Technical Disclosure Bulletin, vol. 37, NO. 10, Oct. 1994, pp. 255–257.
Cook et al., "They Reyes Image Rendering Architecture," Computer Graphics, vol. 21, No. 4, Jul. 1987, pp. 95–102.
Deering, "Data Complexity for Virtual Reality: Where do all the Triangles Go?," Proceedings of IEEE VRAIS, Sep. 1993), pp. 357–363.
Hoppe, "View–Dependent Refinement of Progressive Meshes," Proceedings of SIGGRAPH, Aug. 1997, pp. 189–198.
Montrym, "InfiniteReality: A Real–Time Graphics System," Proceedings of SIGGRAPH, Aug. 1997, pp. 293–301.
Upstill, *The RenderMan Companion*, Copyright 1990 by Pixar, pp. 134–146, 171–178,193–200, 209–237, 273–285, and 287–309.

* cited by examiner

Primary Examiner—Jeffery Brier
Assistant Examiner—Ryan Yang
(74) Attorney, Agent, or Firm—Conley, Rose & Tayon, PC

(57) ABSTRACT

A method for estimating rendering times for three-dimensional graphics objects and scenes is disclosed. The rendering times may be estimated in real-time, thus allowing a graphics system to alter rendering parameters (such as level of detail and number of samples per pixel) to maintain a predetermined minimum frame rate. Part of the estimation may be performed offline to reduce the time required to perform the final estimation. The method may also detect whether the objects being rendered are pixel fill limited or polygon overhead limited. This information may allow the graphics system to make more intelligent choices as to which rendering parameters should be changed to achieve the desired minimum frame rate. A software program configured to efficiently estimate rendering times is also disclosed.

40 Claims, 18 Drawing Sheets

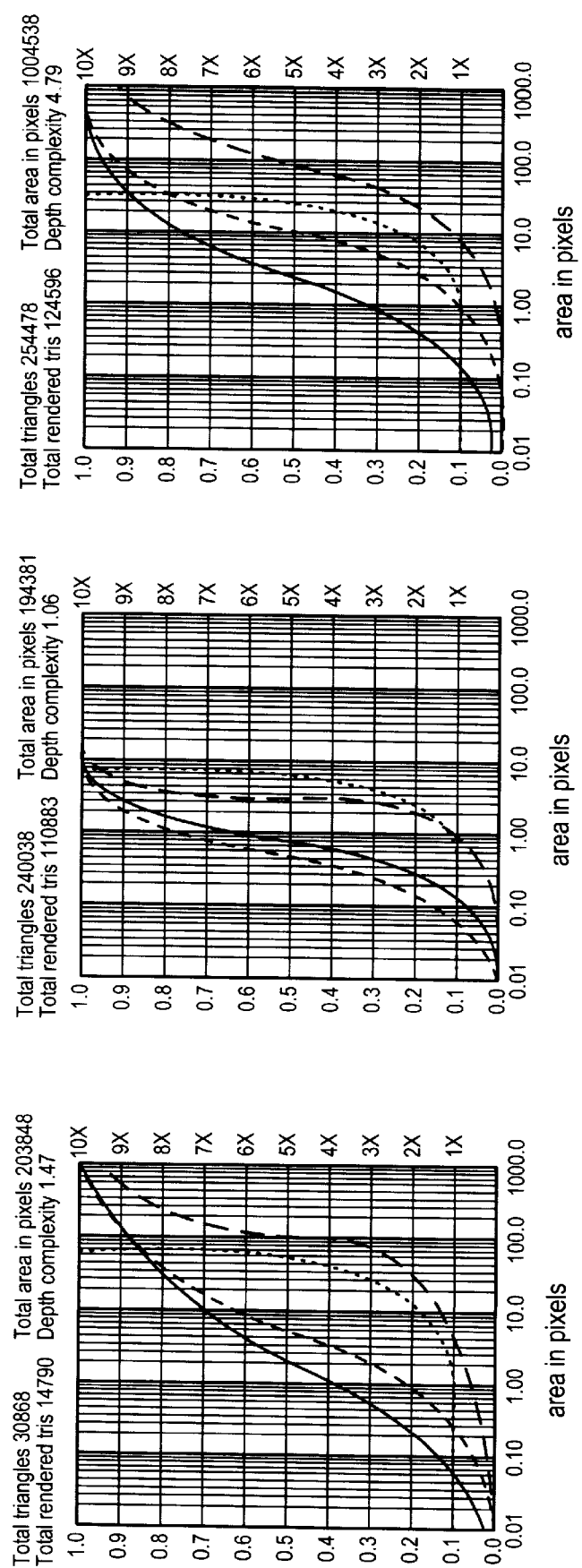

Triangle aspect ratio statistics for T Rex.

Triangle aspect ratio statistics for Engine.

Screen space prediction of f(a) based on model space.

Human eye variable density regions.

Close up of Human eye variable density regions

| Display Device 400 | Display Pixel Resolution 402 | Display pixel sz in min 404 | Display FOV in steradians 406 | Pixels: 0.47 min limit 408 | Pixels: 1.5 min limit 410 | Pixels: eye limit 412 | Pixels: display limit 414 | Pixels: eye & display limit 416 | Triangles: eye & display limit 418 |
|---|---|---|---|---|---|---|---|---|---|
| 18" CRT at 24" | 1280x1024 | 1.6 | 0.26 | 14.1M | 1.37M | 1.59M | 1.31M | 1.06M | 0.38B |
| 24" CRT at 24" | 1920x1200 | 1.4 | 0.36 | 19.4M | 1.88M | 1.92M | 2.30M | 1.55M | 0.56B |
| 37" CRT at 24" | 1280x1024 | 3.0 | 0.73 | 39.9M | 3.86M | 3.20M | 1.31M | 0.94M | 0.34B |
| 65°HMD* | 1280x1024 | 2.9 | 0.73 | 39.4M | 3.81M | 3.17M | 1.31M | 1.01M | 0.73B |
| 95°HMD* | 1280x1024 | 4.0 | 1.17 | 63.6M | 6.16M | 4.68M | 1.31M | 0.88M | 0.63B |
| 31" TV at 11' | 640x480 | 1.0 | 0.03 | 1.4M | 0.14M | 0.40M | 0.31M | 0.28M | 0.1B |
| 60" HDTV @ 8' | 1920x1080 | 1.0 | 0.16 | 8.7M | 0.84M | 1.17M | 2.07M | 1.07M | 0.38B |
| 50' Movie @ 65' | 2350x1000 | 1.0 | 0.20 | 10.8M | 1.04M | 1.30M | 2.35M | 1.16M | 0.42B |
| Human eye FOV* | na | na | 4.16 | 226.0M | 21.9M | 14.78M | na | na | 10.64B |
| Full Sphere FOV* | na | na | 12.57 | 682.0M | 66.0M | na | na | na | 491.00B |

*stereo.  M: All pixel numbers are in units of millions of pixels.  B: Triangles are in units of billions of triangles per second.

Fig. 18

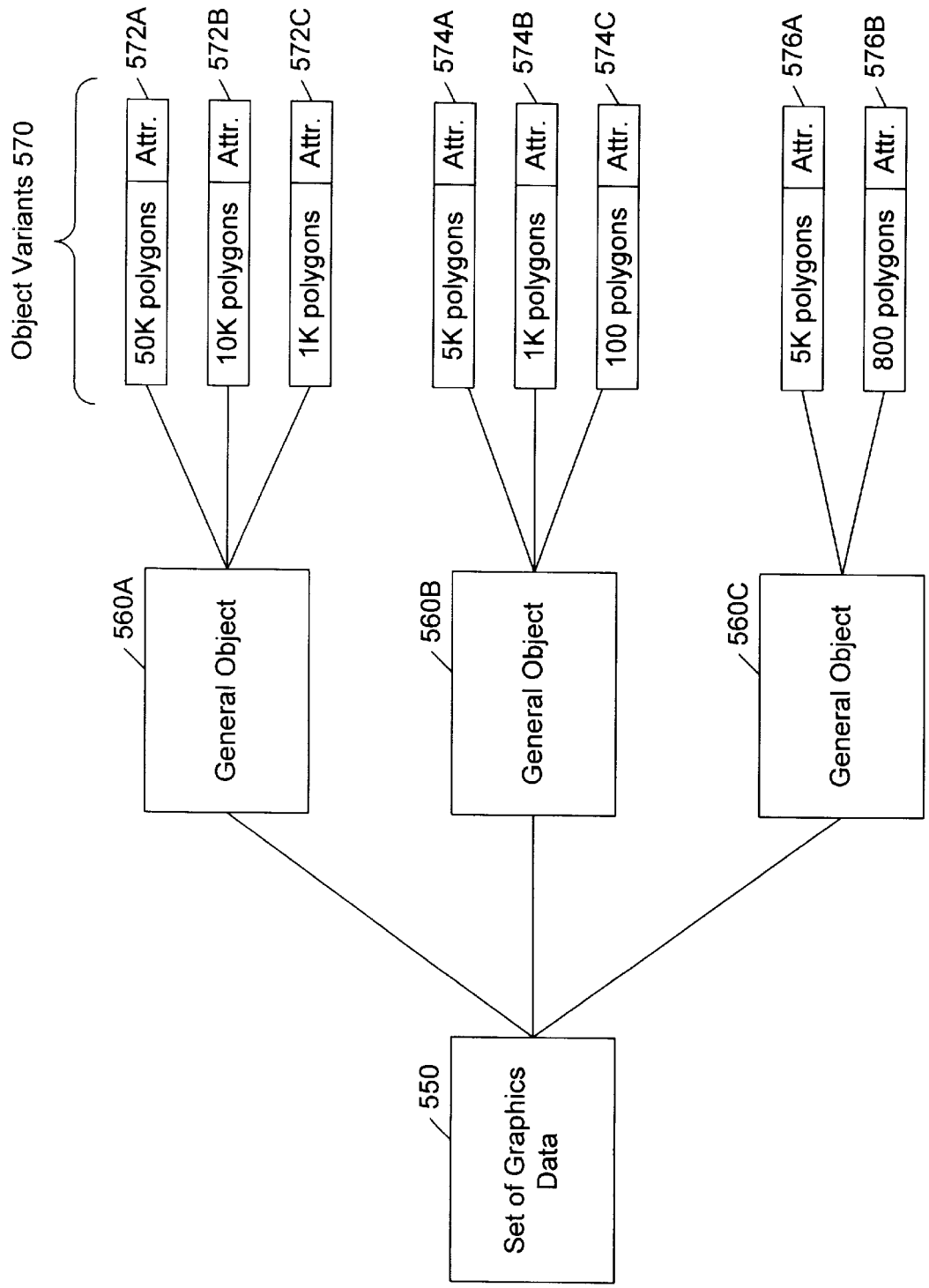

ESTIMATING GRAPHICS SYSTEM PERFORMANCE FOR POLYGONS

PRIORITY CLAIM

This application claims the benefit of U.S. Provisional Application No. 60/074,838, filed Feb. 17, 1998.

BACKGROUND OF THE INVENTION

1. Field of the Invention

This invention relates generally to the field of computer graphics and, more particularly, to estimating the polygon rendering performance of three-dimensional graphics systems.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and higher refresh rates than earlier models. Similarly, the images displayed are now more complex and may involve advanced rendering techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics accelerator) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general purpose central processor. While early graphics systems were limited to performing two-dimensional (2D) graphics, their functionality has now grown to also include three-dimensional (3D) graphics rendering, including 3D graphics operations such as shading, fogging, alpha-blending, and specular highlighting.

The processing power of 3D graphics systems has been improving at a breakneck pace. A few years ago, shaded images of simple objects could only be rendered at a few frames per second, while today's systems support rendering of complex objects at 60 Hz or higher. This higher performance allows modern graphics applications to increase the realism of the scene being displayed.

One common method used to increase the realism of three-dimensional rendered objects is to increase the number of polygons used to display the object. Most modern graphics systems render objects by first dividing or "tessellating" the surface of the object into a number of polygons (i.e., closed plane figures bounded by straight lines). Each polygon is then rendered individually. Rendering typically involves the following steps: (1) calculating a number of parameters for each vertex of the polygon, and (2) interpolating from the vertex parameters to fill in the polygon. Examples of vertex parameters may include color information, translucency information, depth information, lighting information, and texture information.

By increasing the number of polygons used to display an object, the object may appear smoother and may have a more realistic textured appearance. FIG. 1A illustrates a sphere tessellated into a first number of polygons. FIG. 1B is an example of the same sphere tessellated into a much higher number of polygons. As shown by the figures, a more realistic scene may be rendered by using larger numbers of smaller polygons. Note since all polygons are typically broken into triangles for rendering, the terms "polygon" and "triangle" shall be used interchangeably herein.

Wherein this technique improves realism, it also increases the processing burden on a graphics system. Previous graphics applications used large polygons that contained a large number of pixels. Thus, the "overhead" of setting up each polygon consumed a relatively small portion of the graphics system's overall processing resources, while the process of interpolating the pixelswithin the polygon used the majority of the graphic system's processing power. These systems are referred to as "pixel fill limited" because the limiting performance factor is the number of pixels the graphics system is capable of calculating. Modern applications, however, are now using polygons that may contain only one or two pixels (or even less than one pixel, in some cases). Thus, the work of setting up polygons may need more time than the actual pixel calculation process. These systems are referred to as "polygon overhead limited" because the overhead associated with setting up polygons is the performance limiting factor. Note a particular graphics system may be polygon overhead limited for a particular scene (e.g., one with many small polygons) and pixels fill limited for a diferent scene (e.g., one with larger polygons or more complex pixel-level enhancements).

FIG. 2 is a graph illustrating one possible performance limit curve for a graphics system. As shown in the figure, once the polygon area falls below a particular size $a_c$, the system's performance is limited by the polygon overhead. Similarly, once the polygon size rises above ac, performance is limited by the maximum pixel fill rate.

As previously noted, the processing power of graphics systems has increased rapidly in the past few years. However, even with these great increases, new applications continue to demand even greater performance. For example, some computer games and virtual reality programs require real time rendering of multiple, complex, three-dimensional objects at high frame rates. These graphics intensive applications place high demands upon graphics system performance and may easily exceed the graphics system's capabilities.

One possibility is to lower the frame rate when the application exceeds the performance capabilities of the graphics system. However, this is not always possible because some graphics applications have minimum frame rates below which the applications become unusable. For example, if the frame rate of a 3D computer game falls below a certain level, the movements and animation on the screen will become jerky. Furthermore, if the frame rate drops below a critical level, then the delay between when the user performs an action (e.g., firing a missile) and a graphic representation of that action appearing on the screen will be so long as to make the game unplayable. Thus, for many applications the frame rate may not be lowered below a certain predetermined level, even when the complexity of the scene being rendered increases dramatically.

In contrast, however, if the system is polygon overhead limited, the number of polygons displayed can be adjusted without the limitations and drawbacks that lowering the frame rate has. For example, assuming a particular graphics system that can render a maximum of 1000 polygons per frame at a particular frame rate (due to polygon overhead), if a single moving sphere is displayed, then the sphere may be divided (i.e., "tessellated") into no more than 1000 polygons without affecting the frame rate. If two similar moving spheres are displayed, the graphics system can either cut the frame rate in half (with the negative side effects discussed above), or it can display each sphere using only 500 polygons. Using the second alternative may result in the spheres appearing more jagged (i.e., the sphere's surfaces will not appear as smooth), but without any added jerkiness to their movement. This technique may also be referred to as reducing the level-of-detail (LOD) of the scene.

If the system is pixel fill limited, another alternative to reducing the frame rate is to reduce the overall number of pixels being rendered. The may be accomplished by reducing the pixel area of a given objection, reducing the number of objects displayed, or by reducing the number of pixels in the overall scene.

Ideally, the graphics system would be able to accurately determine the optimum size and number of polygons and the optimum number of pixels. This would allow the graphics system to optimize the displayed scene to contain the maximum number of polygons without lowering the frame rate and without wasting performance on polygon overhead.

Thus, a graphics system capable of efficiently determining the performance limits for a particular scene is desired. Similarly, a method for efficiently determining graphics system performance limits is also desired.

SUMMARY OF THE INVENTION

The problems outlined above may in part be solved by a graphics system configured to estimate its rendering performance for a particular set of geometry data. In some embodiments, the graphics system may be configured to estimate scene rendering times on a frame-by-frame basis, and then adjust rendering parameters (e.g., the number of polygons, pixels, samples or features) to maintain a minimum desirable frame rate.

In one embodiment, the graphics system may estimate rendering performance by calculating an "effective polygon area" for each polygon in the geometry data. The effective polygon area is an estimate of rendering time for a polygon that takes into consideration the polygon's effect on the graphics system in light of the system's pixel fill and polygon overhead limitations. The graphics system may estimate the sum total of the effective area for all polygon to generate a total "effective area". This effective area may be calculated for both model space and screen space. As used herein "model space" refers to the coordinate system that the geometry data is specified in, while "screen space" refers to the coordinate system defined by the pixels on the display device. Similarly, a "geometry data set" refers to graphics data that is received and rendered into one or more frames by the graphics system. The graphics data may comprise vertices and or instructions (e.g., opcodes) that provide the graphics system with enough information to render (i.e., draw) the data. The graphics data may represent a combination of both 2D and 3D objects to be rendered.

In some embodiments, the effective area may include all or part of the back-facing sides of the polygons. These embodiments may generate more accurate estimates for graphics systems that utilize significant system processing resources to cull backing polygons.

Furthermore, the effective area may include a "false area" value for polygons below a predetermined size. False area refers to an additional theoretical area that, if rendered as part of the polygon, would approximate the overhead processing time for polygons below a predetermined size. Another way to compensate for overhead processing times of small polygons is to simply round all polygons below a predetermined critical area ( referred to herein as "$a_c$") up to the critical area $a_c$. The value $a_c$ represents the minimum size of a polygon below which the polygon set-up overhead becomes a significant limiting factor. For example, a large polygon (e.g., 40 pixels in area) may require only two clock cycles to set up and forty clock cycles to render. In this case, the overhead associated with setting up the polygon is relatively small when compared with the time required to render the polygon. However, a small polygon (e.g., only a single pixel in area or even sub-pixel in area) may still require two clock cycles to set up but only one clock cycle to render. Thus, for smaller polygons the overhead of setting up the polygon may become a significant performance-limiting aspect. By rounding smaller polygons up to the predetermined critical area $a_c$, the effect of set up overhead may be calculated for small polygons. Similarly, adding false area to the area of small polygons performs the same function. Note the value $a_c$ may vary across different graphics systems and may also vary according to the particular configuration of the graphics system (e.g., the color depth).

The system may be configured to use pre-calculated values of $a_c$ to determine whether a particular set of geometry data will be polygon overhead bound or pixel fill bound. As noted above, the term polygon overhead bound refers to when the graphics system's performance is limited by per-polygon processing (e.g., lighting). In contrast, the term pixel fill bound refers to when the graphics system's performance is limited by per pixel calculations (e.g., transparency, texturing, and anti-aliasing) or bandwidth.

In one embodiment, the graphics system may be configured to perform these calculations in real-time or near-real-time. As used herein, a task is performed in "real time" if it is performed without causing noticeable delay to the average user (e.g., on a per-frame or per-display device refresh cycle basis). Conversely, as used in herein, a task is performed "offline" if it is not performed in real time (i.e., it causes noticeable delay to the user).

In some embodiments, after determining that a particular set of graphics data will be polygon overhead bound or pixel fill bound when rendered and that the graphics system's frame rate will fall below a predetermined threshold, the graphics system may dynamically make modifications to the scene being rendered or the rendering parameters in order to raise the frame rate above the threshold. For example, if the set of graphics data is pixel fill bound, then the graphics system may be configured to reduce the number or density of samples or pixels in the scene. Alternatively, the graphics system may reduce the overall size of the object or image being rendered.

In contrast, if the set of graphics data is polygon overhead bound and the system's frame rate falls below a predetermined threshold, the graphics system may reduce the level of detail (LOD) by either tesselating the scene or object using larger polygons, or the graphics system may select a pre-tesselated set of graphics data with fewer polygons. Reducing the number of objects displayed may further increase frame rates.

In some embodiments, the graphics system may calculate "cumulative probability distributions" to support the real-time calculation of performance limits for scenes or objects to be rendered. The cumulative probability distributions represent the cumulative distribution of polygon sizes in the particular geometry data set. The cumulative probability distribution may be calculated in two forms: (1) as the probability of a randomly selected polygon having an area of $a_c$ or less (referred to as $f(a_c)$), or (2) the probability that a randomly chosen point on the surface belongs to a polygon with an area of less than or equal to $a_c$ (referred to as $g(a_c)$). The functions $f(a_c)$ and $g(a_c)$ may also be calculated for screen space by applying a predetermined constant s that represents a scaling factor indicative of the scaling that takes place when converting model space polygons to screen space polygons. These screen space cumulative probability distribution functions are referred to herein as $\hat{f}(a_c s)$ and $\hat{g}(a_c s)$, respectively.

To allow real-time or near-real-time estimation of geometry rendering times, a number of preliminary calculations may be performed ahead of time in an off-line fashion. While these calculations may also be generated in a real-time or near-real-time fashion, performing them off-line may further reduce the latency of the remaining real-time portion of the calculations. For example, several different values for $a_c$ (corresponding to different configurations of the graphics system) may be calculated offline. The function pm(x) may also be calculated off-line, wherein pm(x) is a model space probability distribution according to the following Dirac-delta function: pm(a)=δ(A–a), wherein A is the area of a single polygon in model space.

The system may also calculate $\hat{f}(a_c s)$ and $\hat{g}(a_c s)$ off-line by numerical integration according to the following equations:

$$\hat{f}(a) = \int_0^a pm(x)\,dx + \int_a^\infty \frac{a}{x} \cdot pm(x)\,dx,$$

wherein $f(a) = \hat{f}(a_c s)$; and $$\hat{g}(a) = \int_0^\infty \int_0^{\min(y,a)} 2 \cdot \frac{x^2}{y^2} \cdot pm(y)\,dx\,dy,$$

wherein $g(a) = \hat{g}(a_c s)$.

By calculating $a_c$, $\hat{f}(a_c s)$, and $\hat{g}(a_c s)$ off-line, estimating the time required to render the graphics data may be efficiently accomplished in real-time by: (1) calculating the scaling factor s from the modeling and viewing matrices, and (2) evaluating the rendering rate according to the following formula:

$$\text{render\_time} = \frac{\text{effective\_area}}{\text{pixel\_fill\_rate}}$$

$$= \frac{\left(a_c \cdot n \cdot \hat{f}(a_c s) + 1\right) + \left(\frac{1}{2} \cdot s \cdot \text{total\_model\_space\_area}\right) \cdot (1 - \hat{g}(a_c s))}{\text{pixel\_fill\_rate}}$$

wherein the term (½·s·total_model_area ) is used to approximates the total screen area. Note the total model space area may also be pre-computed to further reduce latency.

In one embodiment, the render time estimate may be further enhanced by addressing the possibility of frustum clipping. Frustum clipping refers the process of culling out polygons that are not within the visible area of the display device (e.g., off-screen polygons). A value α may be computed in real time to represent an estimate of the fraction of polygons that are outside the current view frustum. Once calculated, this value a may be incorporated into the render time estimate as follows:

$$\text{render\_time} = \frac{(1-\alpha) \cdot \text{effective\_area} + \alpha \cdot a_c}{\text{pixel\_fill\_rate}}.$$

While α may be calculated in a number of different ways, one simple estimation may be obtained by examining the object's bounding box and then determining what portion of the bounding box falls outside the displayable region. For a more accurate estimate, a plurality of smaller bounding boxes may be used for the object's polygons.

BRIEF DESCRIPTION OF THE DRAWINGS

The foregoing, as well as other objects, features, and advantages of this invention may be more completely understood by reference to the following detailed description when read together with the accompanying drawings in which:

FIGS. 7–11 are graphs of triangle parameterizations for each of the objects depicted in FIG. 6.

FIG. 18 is a table illustrating various display devices' characterizations.

FIG. 19B is a diagram illustrating one embodiment of a graphics data set;

Figure 1A:
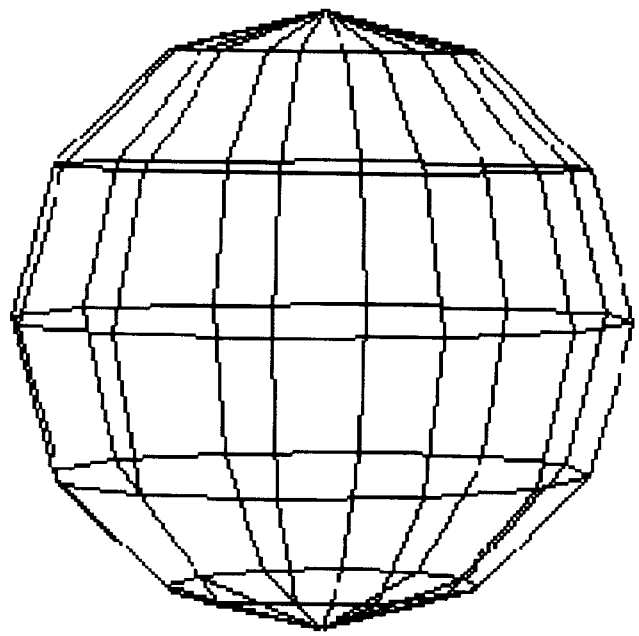
FIG. 1A illustrates a sphere tessellated using a low number of polygons.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 3:
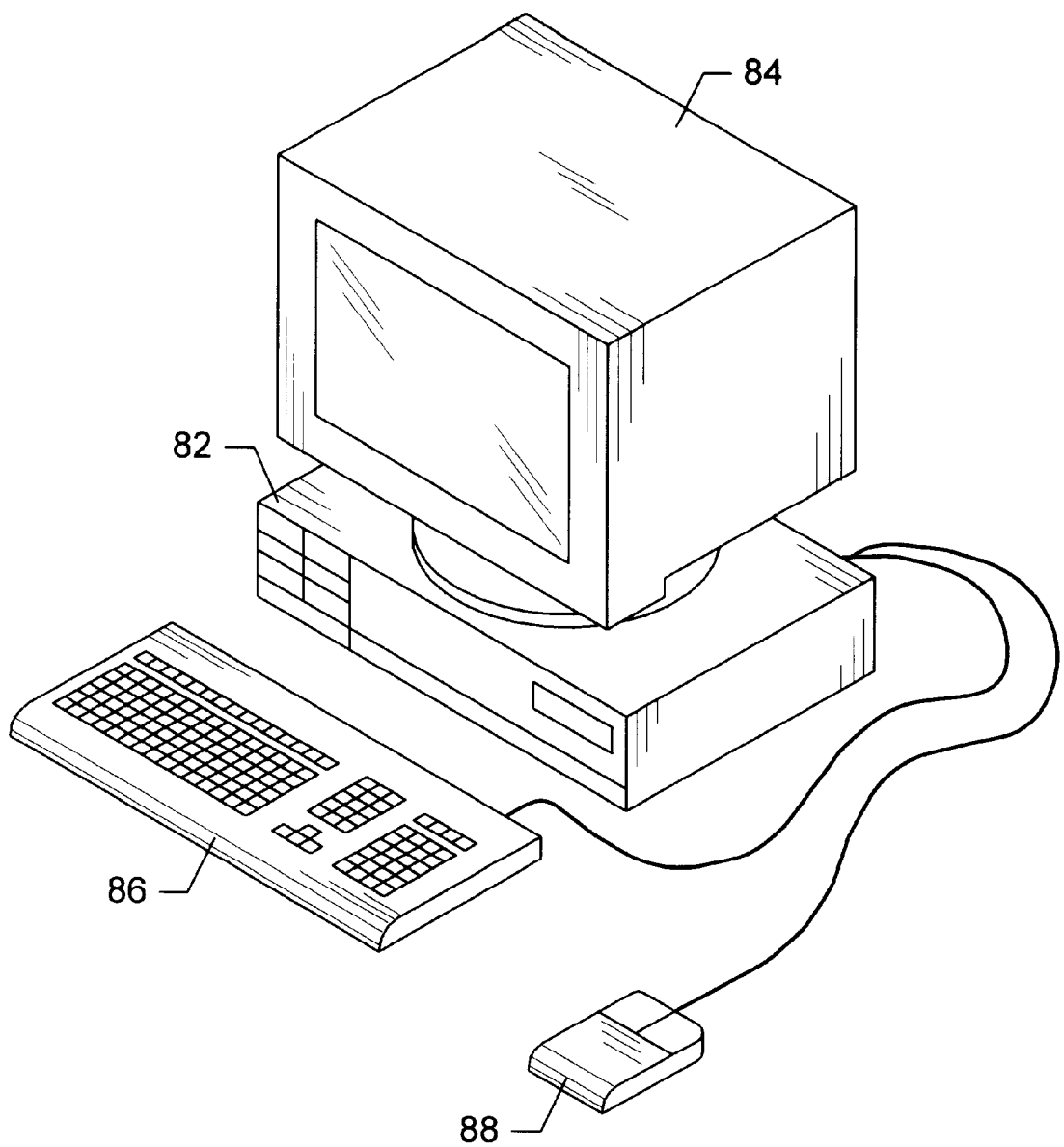
FIG. 3 is a diagram of an example computer system.

Computer System—FIG. 3

Referring now to FIG. 3, one embodiment of a computer system 80 which includes a three-dimensional (3-D) graphics system is shown. The 3-D graphics system may be comprised in any of various systems, including a computer system, network PC, Internet appliance, a television, including HDTV systems and interactive television systems, personal digital assistants (PDAs), flight simulators, driving simulators, ship simulators, virtual reality environments, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, or tablet). Application software may be executed by the computer system 80 to display 3-D graphical objects on display device 84. As described further below, in one embodiment the 3-D graphics system in computer system 80 is configured to efficiently estimate polygon rendering performance and dynamically adjust rendering parameters to improve the frame rate, quality, and realism of images displayed on display device 84.

Figure 4:
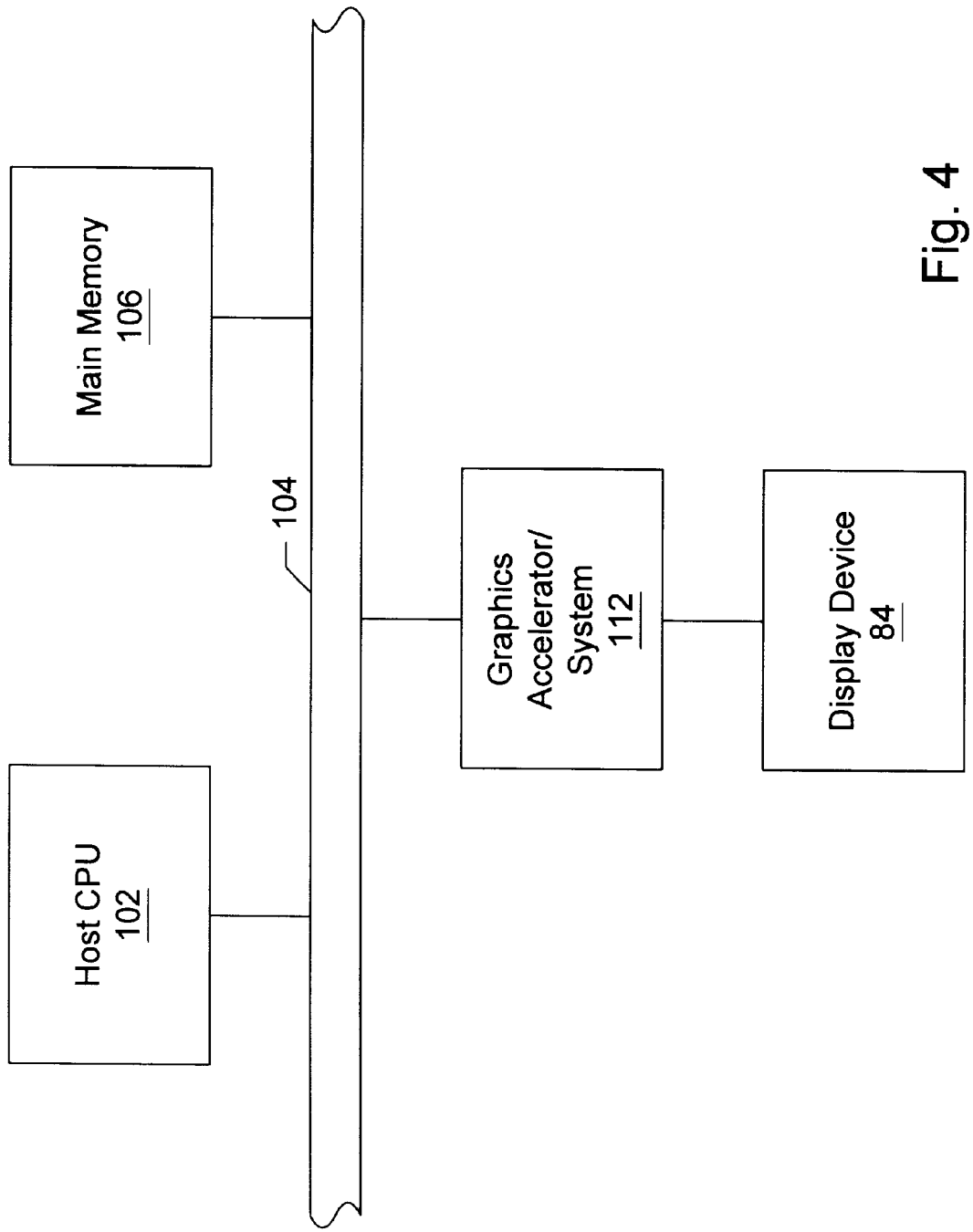
FIG. 4 is a simplified block diagram of the computer system of FIG. 3.

Computer System Block Diagram—FIG. 4

Referring now to FIG. 4, a simplified block diagram illustrating the computer system of FIG. 3 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system or graphics system 112 according to the present invention is coupled to the high-speed memory bus 104. The 3-D graphics system 112 may be coupled to the bus 104 by, for example, a cross bar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to 3-D graphics system 112.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering. In one embodiment, host CPU 102 may be configured to perform the calculations described above to: (1) determine whether the scene being rendered will cause the frame rate to fall below a predetermined minimum threshold, and then (2) vary the rendering parameters according to whether the scene is pixel fill limited or polygon overhead limited.

A graphics application program conforming to an application programming interface (API) such as OpenGL may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in increased performance for handling of incoming color values corresponding to the polygons generated by host processor 102. Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module.

Figure 5:
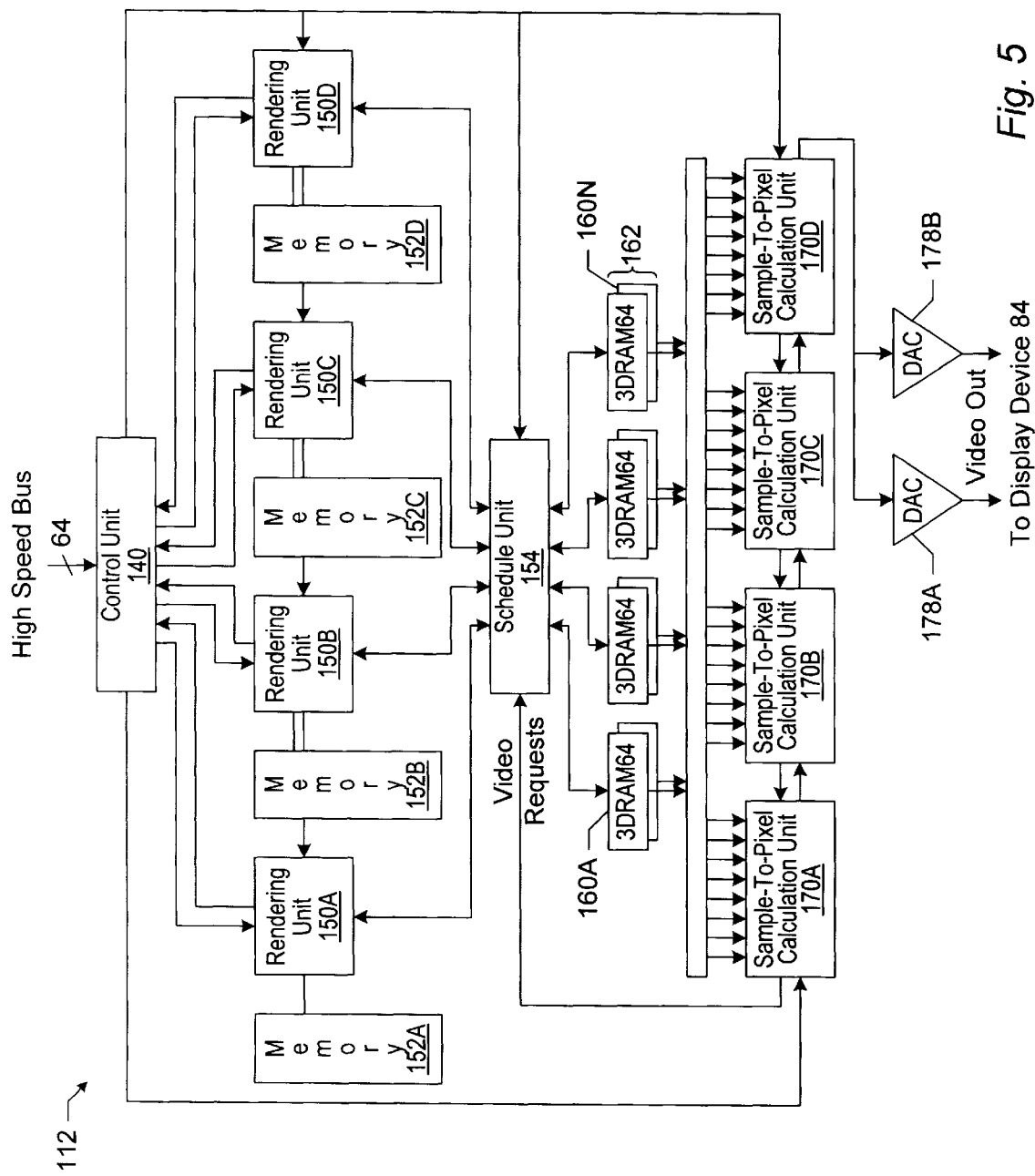
FIG. 5 is a block diagram illustrating more details of one embodiment of the graphics system of FIG. 4.

Graphics System—FIG. 5

Referring now to FIG. 5, a block diagram illustrating details of one embodiment of graphics system 112 is shown. As shown in the figure, graphics system 112 may comprise one or more graphics processors 90, one or more super-sampled sample buffers 162, and one or more sample-to-pixel calculation units 170A–D. Graphics system 112 may also comprise one or more digital-to-analog converters (DACs) 178A–B. In one embodiment graphics processor 90 may comprise one or more rendering units 150A–D. In the embodiment shown, however, graphics processor 90 also comprises one or more control units 140, one or more data memories 152A–D, and one or more schedule units 154. Sample buffer 162 may comprises one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. This may advantageously reduce the bandwidth requirements between computer system 80 and graphics system 112. In one embodiment, control unit 140 may be configured to split and route the data stream to rendering units 150A–D in compressed form. In one embodiment, control unit 140 may be configured to perform the calculations described above to determine whether the scene being rendered will cause the frame rate to fall below a predetermined minimum threshold, and then vary the rendering parameters according to whether the scene is pixel fill limited or polygon overhead limited.

B. Rendering Units

Rendering units 150A–D (also referred to herein as draw units) are configured to receive graphics instructions and data from control unit 140 and then perform a number of functions, depending upon the exact implementation. For example, rendering units 150A–D may be configured to perform decompression (if the data is compressed), transformation, clipping, lighting, set-up, and screen space rendering of various graphics primitives occurring within the graphics data. Each of these features is described separately below.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in U.S. Pat. No. 5,793,371, application Ser. No. 08/511,294, (filed on Aug. 4, 1995, entitled "Method And Apparatus For Geometric Compression Of Three-Dimensional Graphics Data," Attorney Docket No. 5181-05900) and U.S. patent application Ser. No. 09/095,777, filed on Jun. 11, 1998, entitled "Compression of Three-Dimensional Geometry Data Representing a Regularly Tiled Surface Portion of a Graphical Object," Attorney Docket No. 5181-06602). In embodiments of graphics system 112, that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, and polyhedra or free-form surfaces in three dimensions).

Transformation refers to manipulating an object and includes translating the object (i.e., moving the object to a different location), scaling the object (i.e., stretching or shrinking), rotating the object (e.g., in three-dimensional space, or "3-space").

Clipping refers to defining the limits of the displayed image (i.e., establishing a clipping region, usually a rectangle) and then not rendering or displaying pixels that fall outside those limits.

Lighting refers to calculating the illumination of the objects within the displayed image to determine what color and or brightness each individual object will have. Depending upon the shading algorithm being used (e.g., constant, Gouraud, or Phong), lighting may be evaluated at a number of different locations. For example, if constant shading is used (i.e., each pixel of a polygon has the same lighting), then the lighting need only be calculated once per polygon. If Gouraud shading is used, then the lighting is calculated once per vertex. Phong shading calculates the lighting on a per-pixel basis.

Set-up refers to mapping primitives to a three-dimensional viewport. This involves translating and transforming each object from its original model space coordinates to a "world-coordinate" system for all models and then to the established viewport's coordinates. This creates the correct perspective for three-dimensional objects displayed on the screen.

Screen-space rendering refers to the calculations performed to actually calculate the data used to generate each pixel that will be displayed. In prior art systems, each pixel is calculated and then stored in a frame buffer. The contents of the frame buffer are then output to the display device to create the final image. In the embodiment of graphics system 112 shown in the figure, however, rendering units 150A–D calculate "samples" instead of actual pixel data. This allows rendering units 150A–D to "super-sample" or calculate more than one sample per pixel. Super-sampling is described in greater detail below. Note that rendering units 150A–B may comprises a number of smaller functional units, e.g., a separate set-up/decompress unit and a lighting unit.

C. Data Memories

Each rendering unit 150A–D may be coupled to an instruction and data memory 152A–D. In one embodiment, each data memory 152A–D may be configured to store both data and instructions for rendering units 150A–D. While implementations may vary, in one embodiment each data memory 152A–D may comprise 2 8 MByte SDRAMs providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of rendering units 150A–D.

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel.

E. Sample Memories

Sample memories 160A–160N comprise super-sampled sample buffer 162, which is configured to storing the plurality of samples. As used herein, the term "super-sampled sample buffer" refers to one or more memories that store samples. As previously noted, one or more samples are filtered to form output pixels (e.g., pixels to be displayed on a display device), and the number of samples stored may be greater than, equal to, or less than the total number of pixels output to the display device to refresh a single frame. Each samples may correspond to one or more output pixels. As used herein, a sample corresponds to an output pixel when the sample's information contributes to the final output value of the pixel.

Stated another way, the super-sampled sample buffer comprises a sample buffer which stores a plurality of samples. The samples have positions that correspond to locations on the display, i.e., the samples contribute to one or more output pixels at a respective location on the display. These locations may correspond to the center of pixels on the display device, or they may correspond to positions that are between pixel centers on the display device. The number of stored samples may be greater than the number of pixel locations, and more than one samples may be combined in the convolution (filtering) process to generate one or more pixels displayed on the display device.

Sample memories 160A–160N may comprise any of a number of different types of memories (e.g., SDRAMs, SRAMs, RDRAMs, 3DRAMs) in varying sizes. Note while the embodiment described herein utilizes a super-sampled sample buffer, other embodiments may use a traditional pixel frame buffer. However, when using a super-sampled sample buffer, a set of graphics data determined to be pixel-fill limited may cause the graphics system (or corresponding software) to reduce the sample density for part of all of the scene being rendered to improve the frame rate.

Graphics processor 90 may be configured to generate a plurality of sample positions according to a particular sample positioning scheme (e.g., a regular grid, a perturbed regular grid, etc.). Alternatively, the sample positions may be read from a memory (e.g., a ROM table). Upon receiving a polygon that is to be rendered, graphics processor 90 determines which samples fall within the polygon. Graphics processor 90 renders the samples and then stores them in sample memories 160A–N. Note as used herein the terms render and draw are used interchangeable and refer to calculating color values for samples. Alpha values and other per-sample values may also be calculated in the rendering or drawing process. In one embodiment, graphics processor 90 may be configured to perform the calculations described above to determine whether the scene being rendered will cause the frame rate to fall below a predetermined minimum threshold, and then vary the rendering parameters according to whether the scene is pixel fill limited or polygon overhead limited.

E. Sample-to-pixel Calculation Units

Sample-to-pixel calculation units 170A–D may be coupled between sample memories 160A–N and DACs 178A–B. Sample-to-pixel calculation units 170A–D are configured to read selected samples from sample memories 160A–N and then perform a convolution (e.g., a filtering and weighting function) on the samples to generate the output pixel values which are output to DACs 178A–B. The sample-to-pixel calculation units 170A–D may be programmable to allow them to perform different filter functions at different times, depending upon the type of output desired. In one embodiment, the sample-to-pixel calculation units 170A–D may implement a 4×4 super-sample reconstruction band-pass filter to convert the super-sampled sample buffer data (stored in sample memories 160A–N) to single pixel values. In another embodiments, calculation units 170A–D may average a selected number of samples to calculate an output pixel. The averaged samples may be multiplied by a variable weighting factor that gives more or less weight to samples having positions close the center of the pixel being calculated. Other filtering functions may also be used either alone or in combination, e.g., tent filters, circular and elliptical filters, Mitchell filters, band pass filters, sync function filters, etc.

Sample-to-pixel calculation units 170A–D may also be configured to with one or more of the following features: programmable video timing generators, programmable pixel clock synthesizers, crossbar functions, and color-look-up tables. Once the sample-to-pixel calculation units have manipulated the timing and color of each output pixel, the out pixels are conveyed to DACs 178A–B.

F. DACs

DACs 178A–B operate as the final output stage of graphics system 112. The DACs 178A–B serve to translate the digital pixel data received from cross units 174A–B into analog video signals that are then sent to the display device. Note in one embodiment DACs 178A–B may be bypassed or omitted completely in order to output digital pixel data in lieu of analog video signals. This may be useful when display device 84 is based on a digital technology (e.g., an LCD-type display or a digital micro-mirror display).

Definitions

The following functional notations will used herein:

s=model space to screen space scaling factor;

f(x)=probability of a randomly chosen polygon from a collection of polygons having an area of x or less;

g(x)=probability that a randomly chosen point on the surface formed by a collection of polygons belongs to a polygon having an area of x or less;

$\hat{f}(x)$=f(x) for a unity scaling factor s (i.e., s=1);

$\hat{g}(x)$=g(x) for a unity scaling factor s (i.e., s=1);

pm(a)=the model space probability distribution of a single polygon having an area A; and α=an estimate of the fraction of polygons that are outside the view frustum.

Parameterization of a Polygon—FIGS. 6–11

Conceptually, there are three general classes of tessellated objects: (1) objects that have been pre-tessellated to meet certain surface curvature and detail of interest criterion; (2) objects that are dynamically tessellated to meet a size criteria in screen space; and (3) objects that are statically tessellated to meet certain size criteria in model space.

The first class may include most traditional triangulated objects, whether hand-digitized, 3D scanned and simplified, or tessellated from a parametric representation. The second class may include parametric objects dynamically tessellated by various shaders to produce micropolygons. Simple shaders include texture mapping, bump mapping, and displacement mapping. The parametric representation can be as simple as a polygon with texture coordinates, or as complex as high order NURBS (Non-Uniform Rational B-Spline). The third class is from so-called geometric shaders, and generally result from pre-applying shaders that are too complex to evaluate in real-time (e.g., procedural textures). Each of these different classes may produce somewhat different screen space statistics of polygons, but the analysis tools developed in the next few sections apply to all classes.

A common representation of objects to be rendered in 3D computer graphics is as a collection of model space polygons. Such an object may be referred herein as a geometry. Note while triangles may be used in some examples herein for simplicity, the disclosure and claims may be applied more generally to all polygons. During the rendering process, the individual polygons are transformed to a common model space and then projected to screen space. The final rendering process then draws pixels into the frame buffer (or samples into the sample buffer) for eventual display on the display device. First, the properties of screen space polygons are discussed. The results are then generalized to the original model space polygons. For simplicity, in this section all polygons are assumed to be visible, and not subject to frustum, face, or occlusion clipping or culling (these are described in greater detail below).

To determine the area statistics of a collection of screen space polygons, one approach may be to compute a histogram of the frequency of occurrence of screen space polygons of a given area. Normalizing this histogram by the total count of polygons results in a probability distribution function p(a), which represent the probability of a random screen space polygon having the screen area a.

However, linear plots of these probability distributions are visually uninformative, as they tend to look like extreme exponential curves smashed up against the small end of the area plot. In order to make interesting details visible, the probability distribution may be plotted using something like a logarithmic axis for area. Unfortunately, the use of a log axis destroys one of the nice visual properties of probability distributions, i.e., the area under the curve no longer indicates the relative population of a given area of polygon. Probability distributions have another limitation when using empirical data from real objects because quantization effects can leave artifacts in the curve, thereby necessitating artificial smoothing. To avoid these issues, a cumulative probability distribution may be used. Thus the function f(a) may be defined as the probability of a randomly selected polygon having an area of a or less. Given p(a), f(a) is just the definite integral of p(a) between 0 and a:

$$f(a) = \int_0^a p(x)dx \quad (1)$$

It may also be useful to have a function for the cumulative area of polygons, i.e., what amount of the total surface area of the object or scene being rendered is accounted for by polygons of area less than or equal to a. Another way to think of this is the probability that a randomly chosen point on the surface belongs to a polygon with area less than or equal to a. This cumulative area probability is referred to herein as g(a). Given p(a), g(a) is:

$$g(a) = \frac{\int_0^a x \cdot p(x)dx}{\int_0^\infty x \cdot p(x)dx} = \frac{1}{\text{total\_area}} \cdot \int_0^a x \cdot p(x)dx \quad (2)$$

The lower term is just the total (screen space) area of the geometry. Using these definitions, f( ) and g( ) may be computed for a collection of geometries and then plotted.

Figure 6:
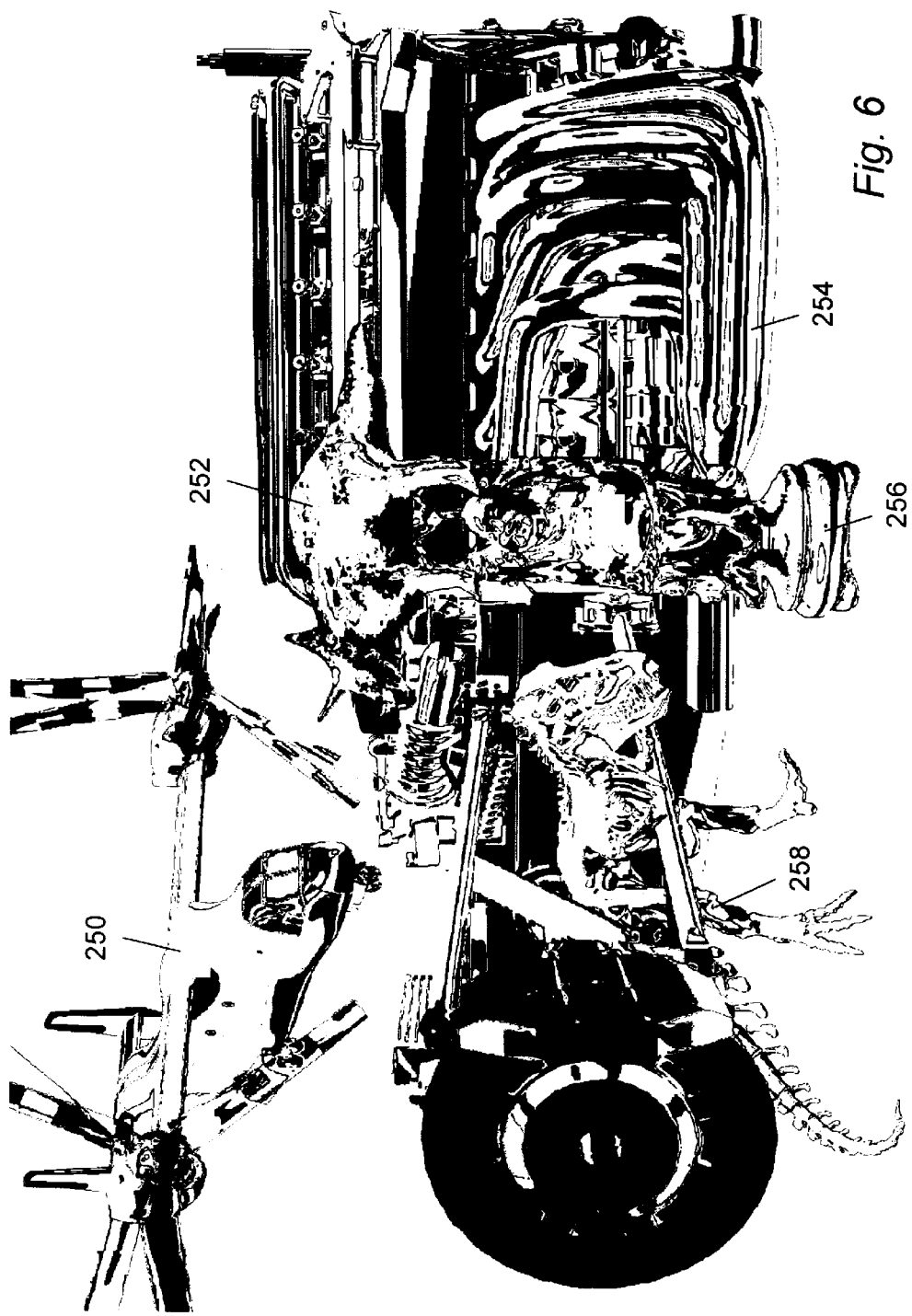
FIG. 6 is an image of five different three-dimensional rendered objects.
Figure 11:
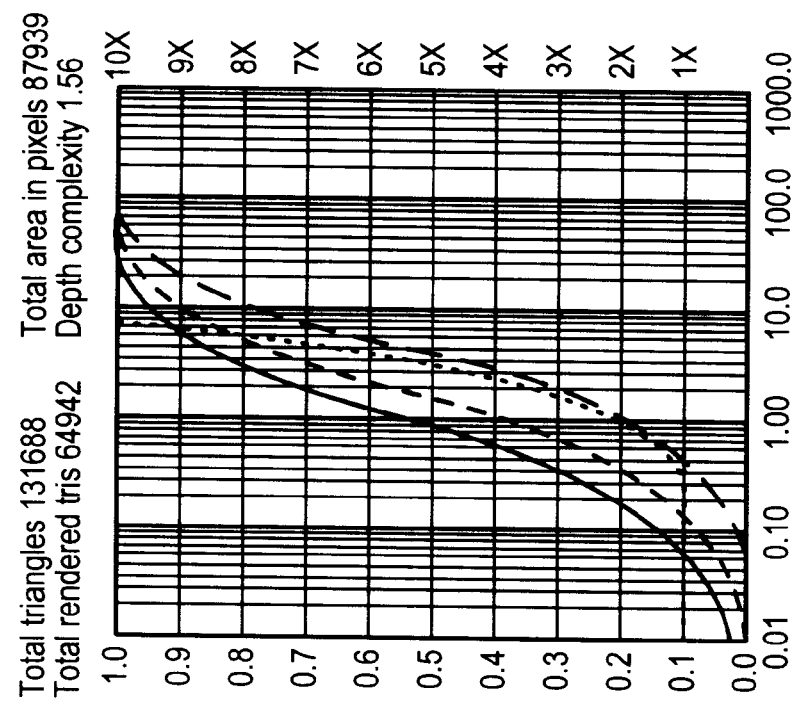
Figure 10:
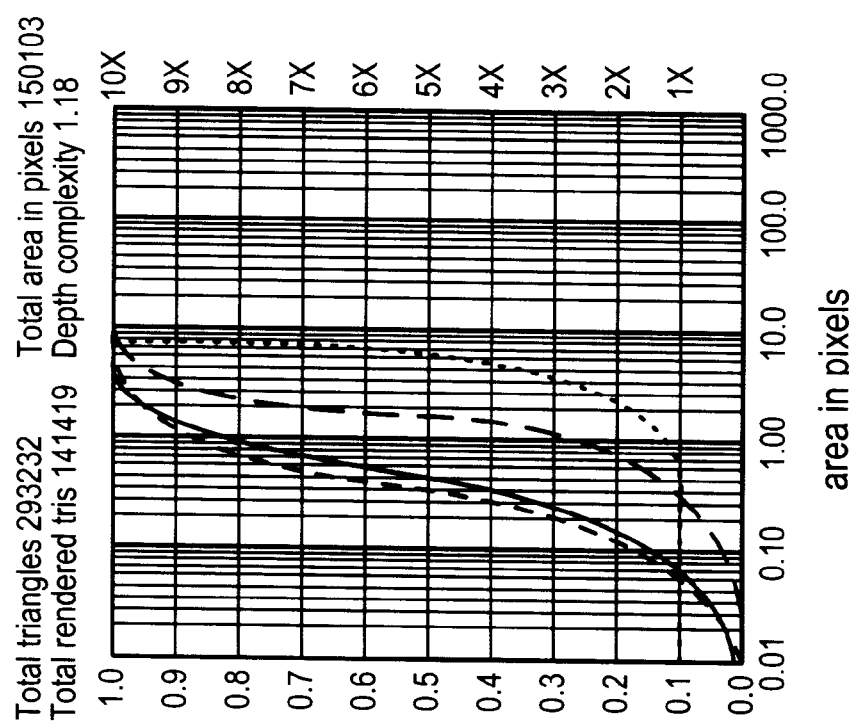

Turning now to FIG. 6, an image of five different three-dimensional rendered objects is shown. The objects are a V22 Osprey aircraft 250, a triceratops 252, an engine 254, a Buddha 256, and a Tyrannosaurus Rex (T Rex) skeleton 258.

Osprey 250 is a traditional tessellated objects from Viewpoint Datalabs having approximately 30,000 thousand triangles. Triceratops 252 is a textured object having approximately 250,000 triangles. It was produced by applying a shader that mip-mapped an image texture onto a Viewpoint Datalabs three-dimensional model having approximately 6,000 triangles. Engine 254 is an MCAD model having approximately 250,000 quarter million triangles. Buddha 256 is a Cyberware-scanned object having approximately 300,000 triangles. T Rex 258 is a Viewpoint Datalabs three-dimensional model having approximately 130,000 triangles.

Using the definitions for f( ) and g( ) described above, graphs of f( ) and g( ) for each object are shown in FIGS. 7–11. In the graphs, f(a) is depicted as a sold black line and g(a) is depicted as a long-spaced dashed line. The function e(a), which is depicted as small-spaced dashed line, and h(a), which is depicted as a medium-spaced dashed line, are functions that will be defined further below. For reference, the triangle counts, screen space area, and depth complexity are displayed above each graph in FIGS. 7–11. Each object was drawn individually and scaled to fit within a 960×680 window.

A variety of observations can be made from the curves in the graphs of FIGS. 7–11. First, note that $f^{-1}$ (0.5) is the median triangle area. Second, for Osprey 250, engine 254, and to some extent T Rex 258, the f(a) curve is shifted substantially to the left of the g(a) curve. This reflects that the majority of the triangles are relatively small in area and that a great deal of the area is locked up in a relatively small number of large triangles. The variance in triangle area can also be seen in the graphs. The range of the eightieth percentile cut includes triangles having sizes that vary between one and two orders of magnitude.

Empirically Understanding f( ) and g( )

Osprey 250 is the simplest of the five objects, having less than an eighth as many triangles as the objects, excluding T Rex 258. Nevertheless, examining $f^{-1}$ (0.5) indicates that the median triangle is less than two pixels in area. From $g^{-1}$ (0.1), it can be seen that 90% of the area is locked up in triangles greater than 10 pixels in size. These statistics turn out to be caused by fine geometric details in the wheels and landing gear. This sort of investigative analysis is one use of the cumulative curves, i.e., analyzing objects to see if and where opportunity for triangle count reduction exist. While engine 254 has eight times the triangle count of Osprey 250, engine 254 has otherwise similar f( ) and g( ) curves. A reason for this can be seen by comparing the screen area of the two objects (screen area equaling the total number of pixels rendered, not unique pixels touched). Engine 254 has five times the screen area of the Osprey, and thus, in terms of normalized screen area, engine 254 has only ⅜ths more triangles per pixel rendered. Given this, it is not surprising that the f( ) and g( ) statistics would be similar. In the other three objects, it is clear that 90% of the triangles are less than three and a half pixels in area. Thus it appears that these objects were not tessellated with large triangles in mind. These large numbers of small triangles place an order of magnitude more demand on real-time hardware renderers when compared with tesselations that use fewer and larger triangles. Note the shapes of the curves are dependent only on the object being rendered. Changes in scale will only result in the shifting of the curves to the right or left on the graph.

Triangle Aspect Ratio and Skew Statistics

Figure 12:
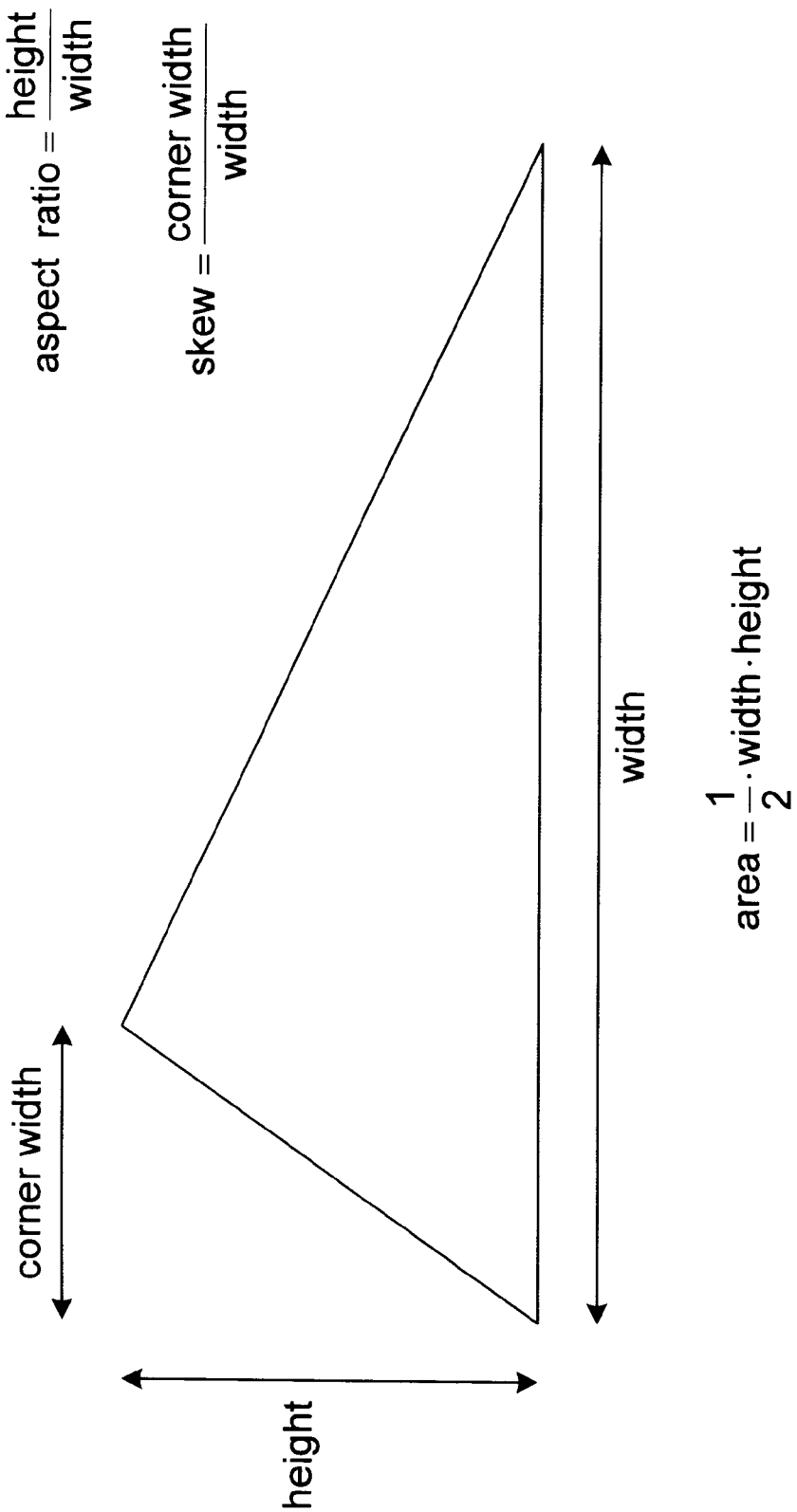
FIG. 12 is a diagram illustrating the calculation of a triangle's aspect ratio and skew.

While the primary determiner of rendering performance is triangle area, in some cases other factors contribute as well. A complete characterizing of screen space triangles thus includes not just triangle area, but also triangle aspect ratio and skew. Turning now to FIG. 12, a diagram illustrating the calculation of a triangle's aspect ratio and skew is shown. As used herein, aspect ratio is defined as a number between 0 and √3/2 representing the ratio of the triangle height to the triangle's longest edge. The largest possible aspect ratio is √3/2 (for an equilateral triangle). Note a right isosceles triangle will have an aspect ratio of 1/2. Aspect ratio is important when a triangle is many pixels in width, but only a pixel or two in height. This is because most rendering hardware is relatively inefficient in filling such triangles. This is caused by various implementation-specific bottlenecks, including: page misses, bank fragmentation, and valid pixel search overhead. Skew is defined as how close the third vertex is to the closest vertex of the longest edge of the triangle, and varies between 1 (thin triangle) and 1/2 symmetrical triangle).

Empirically Understanding Aspect Ratio

Figure 13:
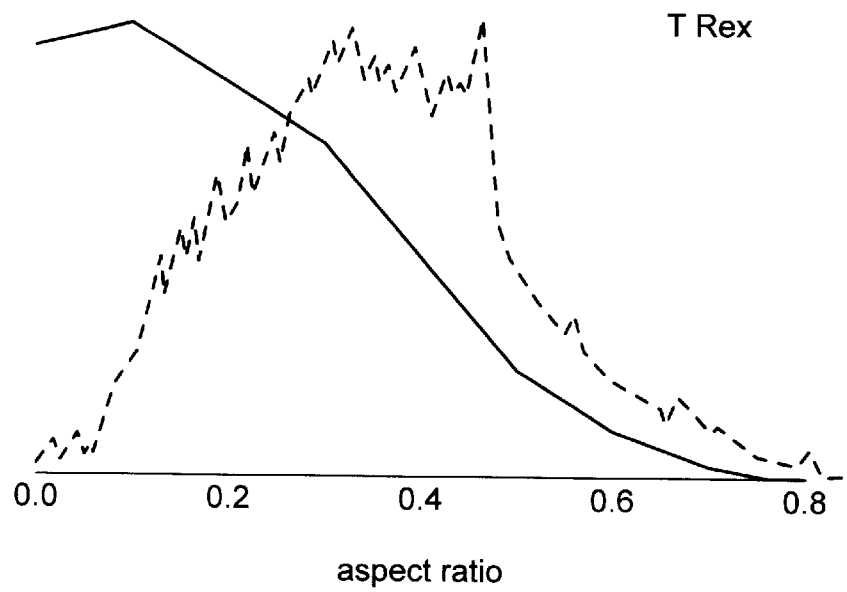
FIGS. 13–14 are graphs that show histograms of aspect ratio in model space and screen space for two objects from FIG. 6.
Figure 14:
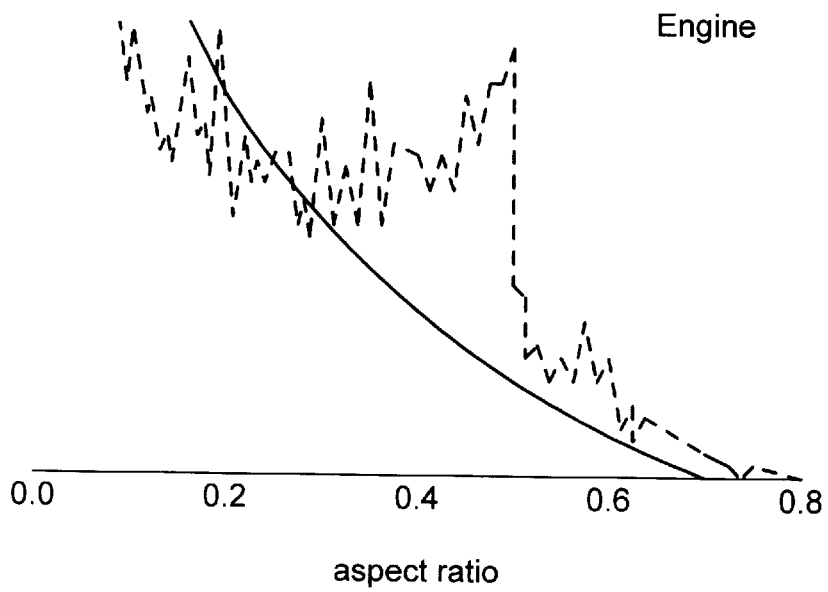

FIGS. 13 and 14 are graphs that show histograms of aspect ratio in model space (dashed line) and screen space (solid line) for T Rex 258 and engine 254. The T Rex model space curve has a pronounced peak near 1/2, indicative of a preponderance of pairs of right triangles from near-square quadrilaterals. The model space curves for Buddha 256 and textured triceratops 252 (not shown) are similar, with even more pronounced peaks at 1/2. Engine 254, by contrast, has a much more equal distribution that is mostly in the range of 0 to 1/2. Engine 254 is also constructed mostly of right triangles, but because of the tessellator, many of these are from more elongated quadrilaterals. Osprey 250's distribution (not shown) is similar to that of engine 254. The projection into screen space tends to smear the aspect ratio probability curves to the left, i.e., towards thinner triangles. This is because most projection angles will make a given triangle thinner in one direction, while only a few angles will make thin triangles fatter. This provides a theoretical basis for (as well as an empirical validation of) the observation that screen space triangles tend to be thin. This trend is useful for architectures that have large performance penalties for small thin triangles. Histograms of skew (not shown) in both model space and screen space tended to be similar and quite flat. Skew typically has little impact on most hardware's performance, and is only mentioned here for completeness.

Figure 15:
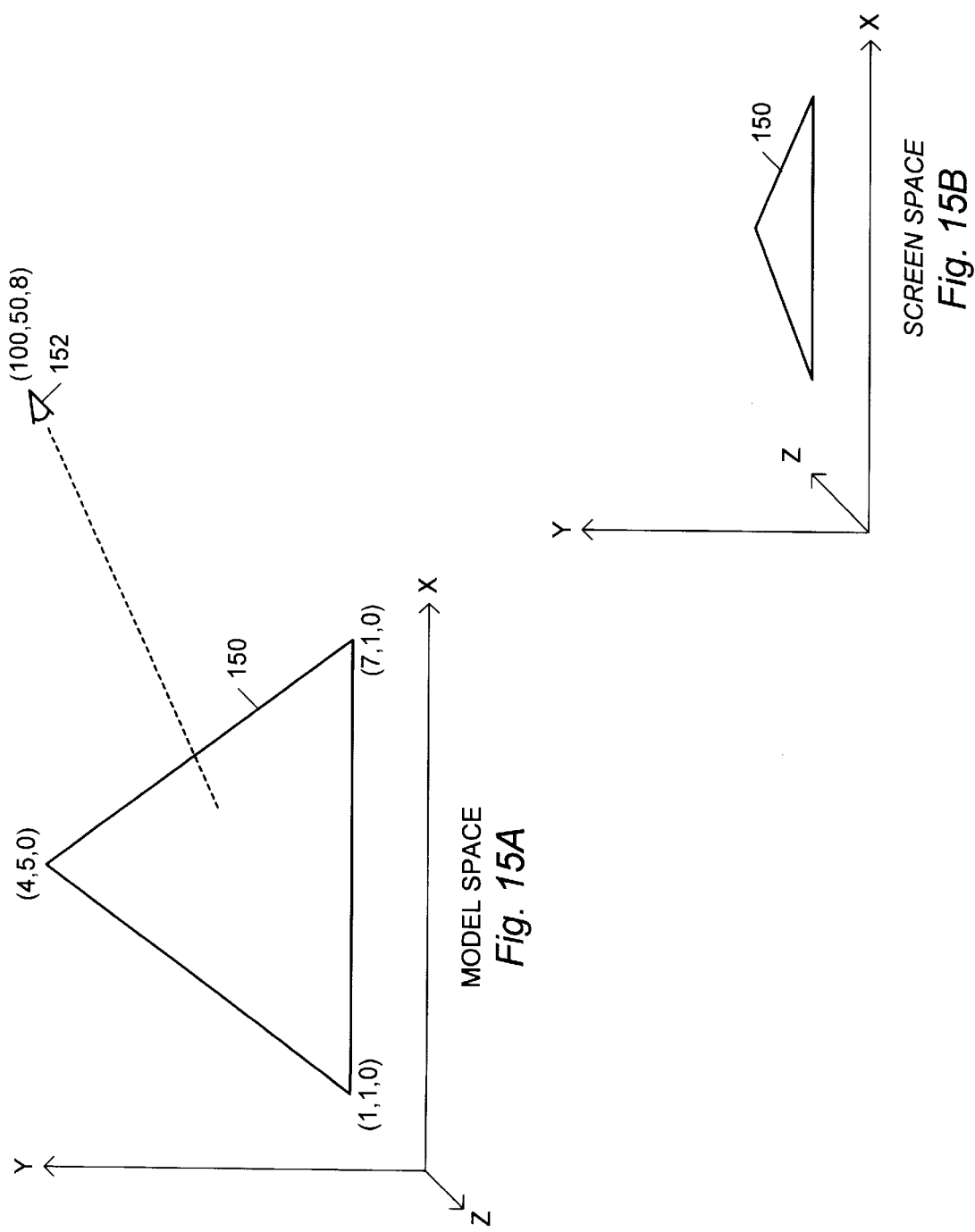
FIGS. 15A–B illustrate the transformation from model space to screen space.

Model Space to Screen Space Transformation—FIGS. 15A–B

Turning now to FIG. 15A, an example of a polygon 150 in model space is shown. Model space refers to the coordinate system used when generating the three-dimensional objects to be rendered. Polygon 150 is a triangle defined by three vertices, each have a three-dimensional coordinate in (x,y,z,) format. How polygon 150 is transformed from model space to screen space is determined by the relative position and orientation of viewpoint 152 (also referred to as a camera). For example, if viewpoint 152 were located at (100,50,0) and directed at the model space origin (0,0,0), then polygon 150 would either disappear from the model space view (illustrated in FIG. 5B) or appear as a thin line. This is because polygon 150 has no depth, and viewpoint 152 would be viewing polygon 150 directly from the edge (similar to looking at a piece of paper edge-on).

FIG. 15B illustrates the appearance of polygon 150 in screen space (i.e., how polygon 150 would appear when viewed on the display of a computer) for the viewpoint position and orientation illustrated in FIG. 15A. Screen space refers to the coordinate system of the pixels on the display device. Model space and screen space coordinates are related as a function of the viewpoint used for rendering. Polygon 150 may be rotated and scaled during the transformation process. This scaling process allows objects positioned closer to viewpoint 152 to appear larger than objects farther away from viewpoint 152. This scaling process may be quantified as a model space to screen space scaling factor "s".

Polygon statistics may be calculated in both model space and screen space. Taking statistics in model space involves processing geometry data at the user level. This only has to be performed once per object. Taking statistics in screen space, by contrast, is more difficult. Either an entire rendering package is written, or an existing package is instrumented (assuming one has access to the source code). Another problem is that the results are view dependent. While difficult to calculate, these statistics are useful to understand the behavior of rendered polygons in screen space.

However, it is also possible to model the average screen space statistics of a given geometry by a transformation of its model space statistics. By averaging screen space statistics over multiple different viewing angles, in the limit the results should look like the convolution of the model space statistics with the statistics of projecting a single polygon at all possible angles. Furthermore, for high polygon count objects, the screen space statistics tend not to vary much with orientation, because geometric detail tends to exist at all orientations.

For example, consider a single polygon of area A in model space. It has a model space probability distribution of a Dirac-delta function: $pm(a)=\delta(A-a)$. Assuming that the scale of the polygon is small relative to the distance of the polygon from the viewpoint, the effects of the viewing projection can be factored into the following two pieces: (1) the model space to screen space scaling factor "s" (resulting in a maximum screen space area of sA); and (2) a rotation in the profile of the polygon. Thus when this polygon is projected over multiple different view orientations (but all from the same distance), these functions are first scaled by s and then smeared into screen space. Thus, the screen space statistics are:

$$p(a) = \begin{cases} \dfrac{1}{sA} & 0 \le a \le sA \\ 0 & \text{otherwise} \end{cases} \quad (3)$$

This means that the conditional distribution of the projected polygons is uniform. A proof of this is outlined further below (see section entitled Proof of Constancy of Projection).

$$f(a) = \begin{cases} \dfrac{a}{sA} & 0 \le a \le sA \\ 0 & \text{otherwise} \end{cases} \quad (4)$$

$$g(a) = \begin{cases} \dfrac{a^2}{(sA)^2} & 0 \le a \le sA \\ 0 & \text{otherwise} \end{cases} \quad (5)$$

In the general case, given a model space probability distribution of pm(a), and a model space to screen space scale factor s, the aggregate screen space statistics (i.e., for a unity scaling factor s=1) are given by the following equations:

$$\hat{f}(a) = \int_0^a pm(x)dx + \int_a^\infty \dfrac{a}{x} \cdot pm(x)dx, \text{ wherein } f(a) = \hat{f}(as) \quad (6)$$

$$\hat{g}(a) = \int_0^\infty \int_0^{\min(y,a)} 2 \cdot \dfrac{x^2}{y^2} \cdot pm(y)dxdy, \text{ wherein } g(a) = \hat{g}(as) \quad (7)$$

It is implicit in these functions that changes in s will result only in a shifting of a constant curve with respect to a. This conjecture was empirically confirmed by comparing screen space plots of f(a) and g(a) with plots obtained by numerically integrating pm( ) traces for the same object.

Figure 16:
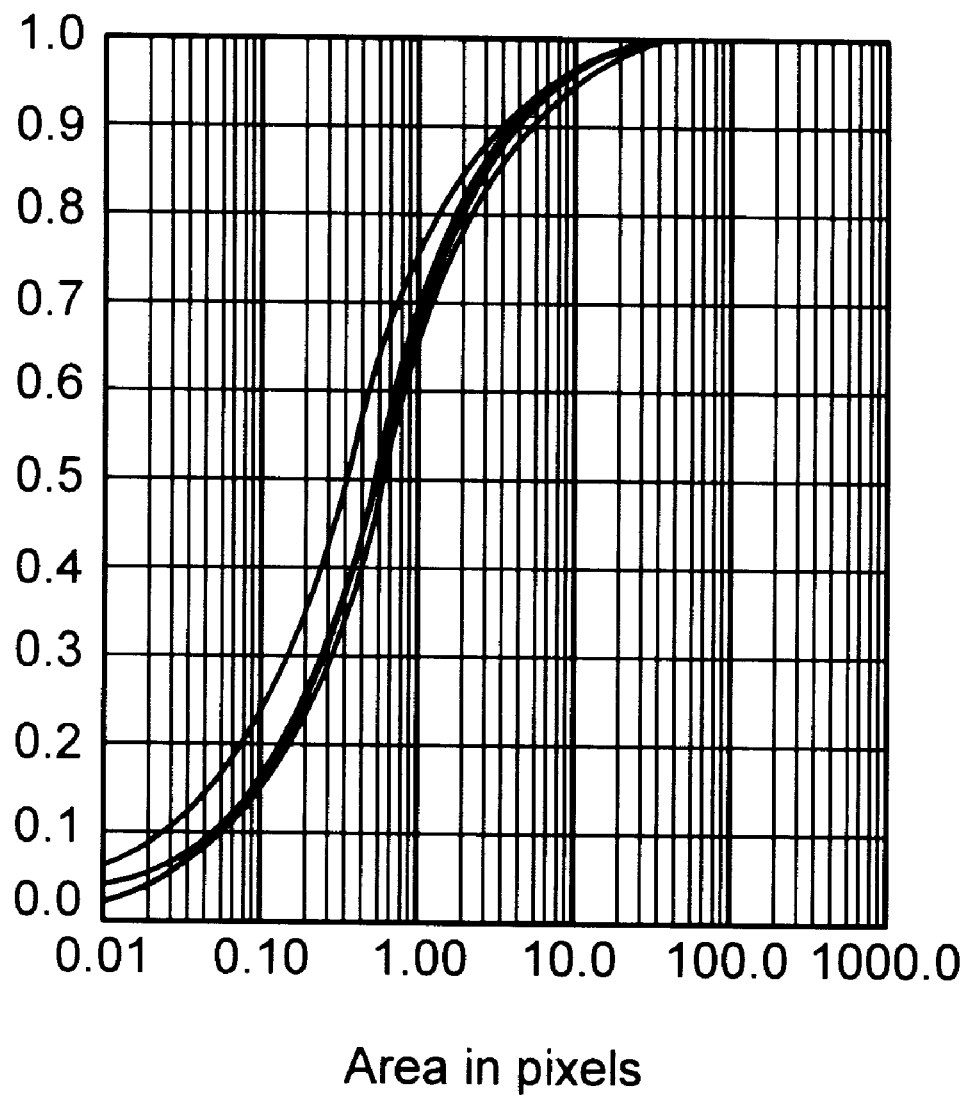
FIG. 16 is diagram illustrating calculations on the T Rex from FIG. 6.

Turning to FIG. 16, a graphic showing an empirical plot of f(a) for random view orientations of T Rex 258 is shown. In the figure, each thin black line represents an empirical plot of f(a) for a single random view orientation, and the thick black line is f(a) derived from numerically integrating model statistics of fm(a). The prediction was for both the shape of the curve and the position of the curve. The position was generated using a value of s computed from the dynamic modeling and viewing transforms. There is some variation due to angle of view, but the overall prediction fits quite well. A similar approach can be used to predict the effects of projection on aspect ratio.

Modeling Rendering Performance

A simplistic model of rendering performance for a machine is just its pixel fill rate, measured in units of pixels per second. In this model, the per-frame rendering time of a given geometry would be just its total rendered screen space area divided by the pixel fill rate. If the scenes being rendered consist mainly of large polygons, this is a fairly accurate model. However, as previously discussed large polygons are rarely the norm.

A more realistic model of rendering performance takes into account that for any given rendering hardware and setting of rendering attributes, there exists a critical screen area of polygon $a_c$, below which the rendering hardware will not be fill limited, but minimum polygon processing overhead time limited. Changes in per-vertex rendering attributes, such as increases in the number of or complexity of light sources, tend to increase the minimum polygon processing overhead time. Changes in per-pixel attributes, such as enabling transparency, texturing, or anti-aliasing, or increases in the complexity of texturing, tend to decrease the per-pixel fill rate.

Figure 2:
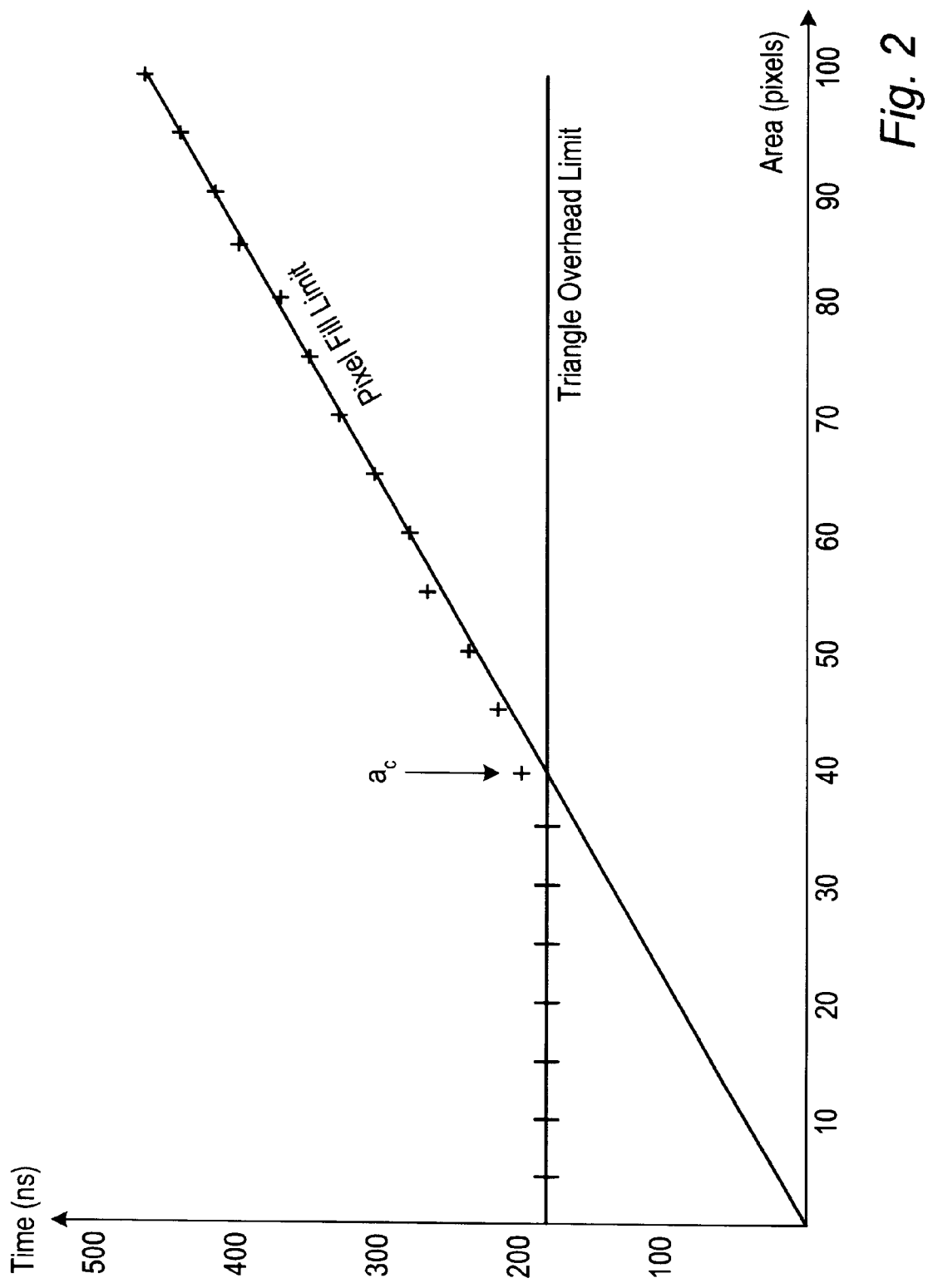
FIG. 2 is a graph illustrating one possible performance limit curve for a graphics system.

As previously noted, FIG. 2 is a plot of polygon render time vs. polygon area based on empirical data obtained by timing of real hardware using glperf(a performance timing application program for OpenGL programs). The horizontal line (fitted to the data) represents the minimum polygon processing overhead time limit. The sloped line represents an asymptotic fill rate limit of 224 million pixels per second. For the particular machine used to generate the plot, and a particular set of rendering attributes, $a_c$, is about 38 pixels and fits the predicted rendering performance model rather well.

To characterize the rendering performance of hardware by a single number, the concept of "false area" may be used. False area converts the effects of minimum polygon overhead into an equivalent area. The idea is that any polygon having an area less than a hardware-specific critical area $a_c$, is said to have the false area $a_c$. Polygons larger than $a_c$ are said to have only "real area". The "effective area" of a polygon is defined to be either its false area or its real area, depending on which side of $a_c$ its area lies. The term "ordinary area" denotes the standard meaning of area. These terms may be extended to apply to an entire geometry by adding up the individual areas of the constituent polygons (or polygons). Thus, the per-frame rendering time of a given geometry is the effective area of the geometry divided by the pixel fill rate of the graphics system. All these areas may be characterized for a geometry in an architecture-independent manner by parameterizing them by $a_c$. Formally, for a given geometry consisting of n polygons (all front facing), with screen space polygon probability p( ), for $a_c=a$, these terms are defined in the following equations:

$$\text{ordinary\_area}(a_c) = \int_0^\infty x \cdot p(x)dx = \text{total\_area} \quad (8)$$

$$\text{false\_area}(a_c) = a_c \cdot n \cdot \int_0^{a_c} p(x)dx = a_c \cdot n \cdot f(a_c) \quad (9)$$

$$\text{real\_area}(a_c) = \int_{a_c}^\infty x \cdot p(x)dx = \text{total\_area} \cdot (1 - g(a_c)) \quad (10)$$

$$\text{effective\_area}(a_c) = \text{false\_area}(a_c) + \text{real\_area}(a_c) \quad (11)$$
$$= a_c \cdot n \cdot \int_0^{a_c} p(x)dx + \int_{s_c}^\infty x \cdot p(x)dx$$

The rendering performance for a geometry can be characterized in an architecture-independent manner by defining the function e(a) to be the ratio of the effective area of a geometry to its ordinary area for a value of $a_c=a$. The function e(a) can be defined in terms of the previously defined functions as follows:

$$e(a_c) = \frac{\text{effective\_area}(a_c)}{\text{ordinary\_area}(a_c)} \quad (12)$$
$$= \frac{a_c}{\text{average\_area}} \cdot (f(a_c) + 1 - g(a_c))$$

The function e(a) is the amount slower than fill-limited that the geometry will render (for a value of $a_c=a$).

This is not necessarily a complete model, however. Modern complex geometries are typically closed shells, with the back-faces not typically intended to be seen. Thus, back-face culling is typically performed (this was the case for our five example geometries). For a more accurate estimation of performance, these back-facing polygons may also be taken into account. On many machines, back-facing polygons cannot be dispensed with in less than the minimum front-facing polygon processing time. Thus, a back-facing polygon can be said to have a false area of $a_c$. To extend the formulas disclosed above to include backing facing polygons, it is assumed that on average half of the polygons will be back facing. This results in an additional "n" polygons with false area $a_c$.

Thus, more complete definitions of false area and e(a) as set forth below:

$$\text{false\_area}(a_c) = a_c \cdot n \cdot f(a_c) + a_c \cdot n \quad (13)$$

$$e(a_c) = \frac{a_c}{\text{average\_area}} \cdot (f(a_c) + 1) - g(a_c) \quad (14)$$

In these equations, n is still the number of front facing polygons, not the total count of polygons in the geometry. On some machines, back-facing polygons can be dispensed with less overhead than a minimal rendered polygon. In these cases back-facing polygons may have a false area of less than $a_c$. In this case the a∗n term added to the false area may be replaced with the actual ratio of back face processing time to minimal polygon rendering time, times n.

Turning now back to FIGS. 7–11, e(a) as defined above is plotted as the short dashed black line. Note that unlike all the other functions plotted, e(a) has a vertical axis not of 0–1, but a magnified range of 0–10× (scale shown on the right hand side of the graph). A related way of looking at the false area effect is to plot the ratio of false area to pure true area for $a_c=a$. This is h(a), and is shown by the medium dashed line in the figures. The function h(a) varies from 0 to 1, and can be directly read as the percentage of the time for which a given geometry will spend transform bound vs. fill bound in a graphics system with $a_c=a$.

$$h(a_c) = \frac{\text{false\_area}(a_c)}{\text{effective\_area}} \qquad (15)$$

$$= \frac{a_c \cdot (f(a_c) + 1)}{a_c \cdot (f(a_c) + 1) + \text{average\_area} \cdot (1 - g(a_c))}$$

Note the curves for e(a) and h(a) shift to the right or left if the model space to screen space scales for the geometry being rendered increases or decreases. However, for a given machine and a given set of rendering parameters, $a_c$ is typically a constant, and thus the rendering efficiency of a machine for a geometry changes when the scale of the geometry changes.

Empirically Understanding e( ) and h( )

In FIG. 7, even though 90% of its area is in triangles greater than ten pixels in size, the graph of e(10) shows that a machine with an a critical area $a_c$ of 10 would render Osprey 250 at less than half the speed of the fill limited rate. This is because 75% of the triangles are less then ten pixels in area. The machine of FIG. 2, with a critical area $a_c$ of 38 pixels, would be more than six times slower than fill limited (the empirical number on this object was 6.8× slower, the prediction is 6.4×). Even a machine with an ac of one pixel would be nearly a factor of two slower than fill rate limited for T Rex 258, Buddha 256, and triceratops 252. The reason why can be seen from g(l) for these dim objects, i.e., 50% to 70% of the render time is locked up in false area.

Applying e( ) and h( ) to Hardware Design

These functions can be applied to graphics hardware design. Given a collection of target geometries to be rendered, one can directly trade off the difference between incremental improvements in polygon rate vs. fill rate. A fill rate improvement of a factor of two may reduce the rendering time for real area by a factor of two, but may also increase $a_c$ by a factor of two. While the overall effect may be to reduce total rendering time, if the geometry was already 90% false area limited (seen by examining h(a)), then the factor of two fill rate improvement will result in less than a 10% rendering time improvement (some real area will turn into false area). Even if the geometry is only 50% false area limited, an infinite improvement in rendering rate may only result in a factor of two rendering time improvement. Making the base polygon rate twice as fast may result in a factor of two reduction in $a_c$. If the geometry was 90% false area limited, then the rendering time may improve by no greater than 45% (some of the false area will turn into real area). The marginal gain depends on the slope of the curves near $a_c$.

As an example, in the Buddha object h( ) is 90% at an $a_c$ of 2, and f(2) is 4× slower than fill limited. Changing $a_c$ to 1 reduces h( ) to 70%, and e( ) to about 2.3×, making rendering 1.7 times faster. If instead the fill rate had been doubled, $a_c$ would have doubled from 2 to 4, and e( ) would nearly double from 4× to 7.8×, almost completely wiping out the factor of two gain in fill rate.

General purpose 3D rendering hardware accelerates the rendering of all sorts of objects, and improvements in fill rate that have negligible effect on most objects will nevertheless be effective for some objects. But overall, for a target market, the statistics of the class of objects to be rendered can be measured, and a well-balanced hardware architecture may trade-off polygon rate and fill rate hardware resources to minimize rendering time for those objects. This may generally be accomplished by keeping $e(a_c)$ in the small integer range.

More Complex Models

Near the critical area $a_c$, hardware can have a somewhat lower fill rate, due to the effects of frame buffer memory fragmentation, inefficient vertex chaining, and low aspect ratio polygons. If necessary, given specific rendering hardware, more accurate machine-specific values for the functions outlined above at $a=a_c$ can be computed. The more accurate values can take these and other effects into account.

Another limitation of the generic model disclosed above is that it assumes isotropic distributions of orientations of polygons in models space. This is not always the case. For example, the large number of flat rib bones in T Rex 258 caused the variations seen in FIG. 16. The behavior of such geometries can be better approximated by the appropriate interpolation of a small number of view-specific statistics. Despite these limitations, the e(a) and h(a) functions as given in (14) and (15) provide a good architecture-independent method for understanding the potential rendering performance of a given geometry. The next section defines a rendering time prediction function, and will show how the function may be used to guide runtime load balancing.

Application to Rendering Control

In real-time simulation applications, an important feature is predictable, consistent frame rendering times. A historic technique to help achieve consistent frame rates is level-of-detail (LOD) objects. Use of LOD objects entails storing several alternate geometric representations of an object, sorted by polygon count. When the per-frame rendering time approaches or falls below a predetermined minimum threshold, the current representation of an LOD object can be changed to use one with a lower polygon count. Alternatively, view-dependent tessellations can be generated on the fly. These techniques work when the object is polygon processing overhead bound, but does not help when the object is fill rate bound.

In cases where the object is fill rate bound, the object may be deleted altogether. Alternatively, the graphics system may be configured to reduce the pixel area for a given object on a per-frame basis. Another alternative may be to dynamically reduce the display resolution, and thereby reduce the number of pixels in the entire scene. Selected background objects may be deleted in other embodiments.

For architectures that utilize super-sampling, the number of samples or the sample density for an object or the entire scene may be reduced as the frame rate drops. The function h(a) provides a formal method to determine the extent to which a given object is fill bound or overhead bound, and moreover how much this would change for other choices within an LOD object. This may advantageously allow for more global and accurate decisions to be made for frame rate control.

Real-time Prediction of Geometry Rendering Time

The $\hat{f}$ and $\hat{g}$ functions can be used to define an accurate, real-time algorithm for predicting how long a given geometry will take to render. As part of off-line processing, pm( ) can be computed for a geometry, and from this $\hat{f}$ and $\hat{g}$ can be computed by numerical integration. Using a procedure like that which produced FIG. 2, a separate off-line process can calculate several values of $a_c$ for important sets of rendering attributes (for a given hardware architecture). Then at run-time, the scaling factor s can be computed from the modeling and viewing matrices, and the geometry's render time can be estimated by the following equation:

$$\text{render\_time} = \text{effective\_area} / \text{pixel\_fill\_rate} \tag{16}$$

$$= \frac{(a_c \cdot n \cdot \hat{f}(a_c s) + 1) + \frac{1}{2} \cdot s \cdot \text{total\_model\_area} \cdot (1 - \hat{g}(a_c s))}{\text{pixel\_fill\_rate}}$$

The total screen area of the geometry from equation (2) can be estimated by multiplying the pre-computed total model space area by one half s. This was used in equation (16).

Rendering times may also be calculated for a plurality of different viewpoints for one or more object variants. The calculated rendering times may then be averaged to obtain an overall estimated rendering time for each object variant. The graphics system may then select the most visually realistic object variants consistent with the desired minimum frame rate based on the average overall estimated rendering times. In another embodiment, the rendering times may be calculated for all possible viewpoints for an object variant and then averaged, or alternatively, only selected representative viewpoints (e.g., overlapping or non-overlapping symmetrical portions of the object or predefined views that have the highest likelihood of occurring) may be used. In another embodiment, the convolution function may be used to calculate and average the rendering times for all possible viewpoints of the object.

Frustum Clipping

In some embodiments, the method for rendering time prediction may also be configured to take into account the effects of view frustum culling. View frustum culling refers to discarding polygons that are not within the current visible region of the display. On most modern machines, polygons outside the view frustum are trivially rejected in processing time similar to back face culling, i.e., usually they will have a false area of $a_c$. Polygons that are actually clipped into one or more pieces generally take considerably longer, but are correspondingly rare, and their effect can usually be ignored. In some embodiments, an estimate of the fraction of the geometry that is outside the view frustum is made at run time. Letting this fraction be $\alpha$, an updated render time prediction function follows:

$$\text{render\_time} = \frac{(1 - \alpha) \cdot \text{effective\_area} + \alpha \cdot a_c}{\text{pixel\_fill\_rate}} \tag{18}$$

Rendering Quality Control

In some other applications, the control constant may be image quality, rather than frame rate. Because rendered image quality is related to keeping the size of the majority of polygons below the Nyquist rate of the combination of the display system, the physical viewer's perception ability, and the image content, the curves also provide a formal method of controlling image quality. Specifically, a user may wish to choose a level of detail object such that for the current s, f(1) is 0.5 or less (e.g., to keep the median area sub-pixel). However, in general this threshold is a qualitative judgment choice, and for many geometries, including most of the example objects presented here, little perceivable quality is lost even choosing the median area to be as high as 2. The reason for this is that visually interesting high spatial frequencies tend to lie in the still large minority of polygons that are sub-pixel in size in such distributions. The fact that some polygons are larger than a single pixel does not violate the display's Nyquist rate, such polygons merely represent the lower spatial frequency areas that most objects have.

This is similar to the statistical argument that successfully lets 2D image compression techniques not encode high frequency energy at all areas of most images, with few visually perceptible artifacts. Note also that most artifacts of Gouraud shading disappear for polygons that are only a few pixels in area. Many high quality software rendering packages use simple flat shading once polygons approach one pixel in size.

Extending to Variable Resolution Displays

Traditionally, level-of-detail object selection decisions are made temporally, based on size and object-importance information. However, in a variable-resolution sample buffer, the LOD decision may also take into account the minimum local pixel size in the area of the screen where a geometry is to be rendered. In the method outlined above, this is handled by the appropriate pre-scaling of s to match this local pixel size.

This empirical result, i.e., that most geometries do not increase in image quality once the median polygon size approaches one pixel, is useful in understanding the ultimate performance requirements for rendering. It is this one-or-fewer-polygons-per-pixel density number, when combined with human visual system limits and physical display device limits, that will allows the method to estimate an appropriate maximum polygon rendering rate target for a given display device.

Limits of Human Vision

The eventual consumer of all 3D rendering is the human visual system. With display technology and real-time hardware rendering speeds ever increasing, graphics systems are on the threshold of surpassing the human visual system's input capabilities. On a machine with a single user and a sustained render frame rate of 60 Hz, even present day CRTs exceed the maximum spatial frequency detection capability of the human visual system, in regions away from where the fovea is looking. The fovea is a region of the human retina that has the most acute visual perception.

To take advantage of this situation, hardware rendering architectures may implement some form of variable resolution sample buffer. In such a sample buffer, the spatial resolution is not fixed, but is instead programmable (e.g., on a per-frame basis) to match the variable-resolution nature of human vision. Such pixels can be anti-aliased, and the anti-aliasing filter's frequency cut-off can also be configured to vary dynamically to match the local effective pixel density.

Highest Resolution Perceivable Pixels: 28 Seconds of Arc

Several physical factors limit the highest spatial frequencies that can be perceived by the human eye. The diffraction limit of the pupil, the foveal cone spacing, and neural trace and physiological tests all confirm a maximum perceived frequency of approximately one cycle per arc-minute (half arc-minute pixels). This is under optimal (but non-vernier) conditions, including 100% contrast. While not quite directly comparable, so-called "20/20" vision represents detecting image features twice as large.

Vernier conditions are a common example of hyperacuity, e.g., when one can detect a shift as small as three seconds of arc in the angular position of a large visual object. Here the visual system is reconstructing higher spatial frequency information from a large number of lower frequency samples. However, the visual system can do the same for lower frequency rendered 3D graphics images so long as the higher spatial frequencies were present during the anti-aliasing process.

Figure 17A:
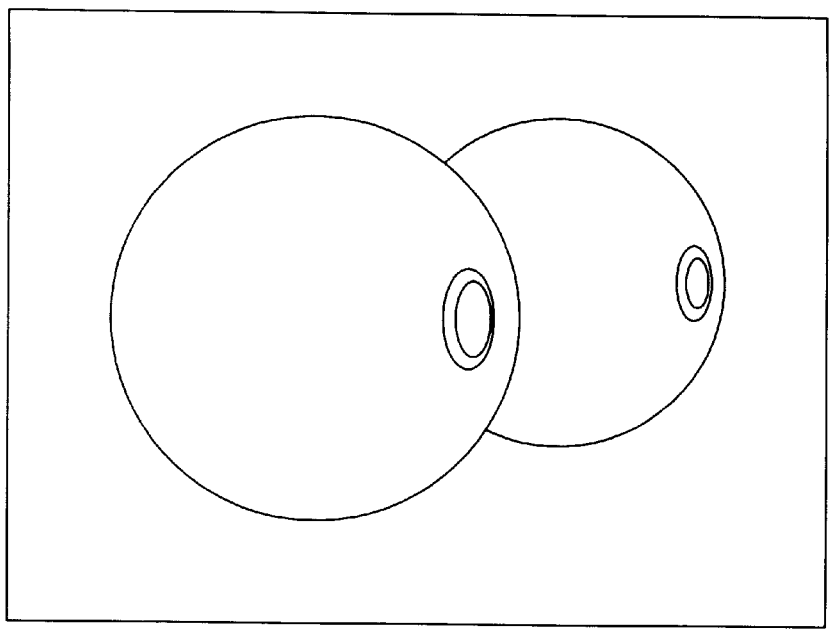
FIGS. 17A–B are diagrams illustrating regions of the human eye.
Figure 17B:
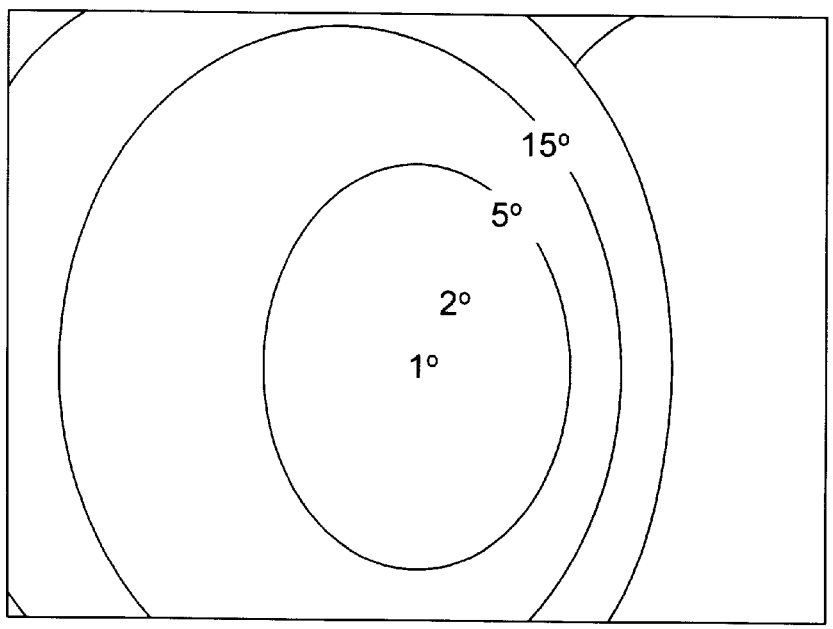

Variable Resolution: 1/2@±1°, 1/4@±2°, 1/8@±5°, 1/16@±12°—FIGS. 17A–B

This high resolution, however, applies only to the central 2° of vision. Outside of this region, the cone spacing and measured perceptional acuity drop off even faster than the optical limits. In many textbooks, this drop off is plotted as a sharp cusp. However, this representation does not do justice to how small the high spatial frequency perception region of the visual field is. FIG. 17A plots an alternate visualization of this data onto the surface of a unit sphere: which portions of the 4π steradian field of view are perceived at what resolution. There are 5 false color bands, each corresponding to a factor of two less perceptorial resolution. FIG. 17b is an enlargement of the central region of the sphere. The center most region corresponds to the central ±1° of the fovea. The second region from there to ±2°, the third region to ±5°, the fourth region to ±12°, and the fifth region to the optical edge caused by the human face. The white represents the non-visible regions. This optical edge has a complex shape, and varies both in the individual and the literature. For these calculations, data from the article "Visual Processing and Partial-Overlap Head Mounted Displays," by Scott Grigsby and B. Tsou, from the Journal of the Society for Information Display, 2, 2 (1994), 69–74 was used. The data has maximum field of views that vary horizontally from −59° to +110°, and vertically from −70° to +56°. To show both sides of this more than 180° field, two unit spheres are shown, one for a right eye and one for a symmetrically-reversed left eye. Thus, if the direction of gaze is known, across the entire visual field, the human visual system can perceive approximately only one fifteenth the visual detail that would be discernible if foveal resolutions were available for the entire field.

To understand the possible impact this may have on 3D graphics systems, FIG. 18 is a table presenting a comparison of estimated visual and display parameters for several representative display devices. In the table, the column 400 represents various display devices. The rectangular displays are characterized by their diagonal measurement and typical user viewing distance. The bottom two entries are the pure limits of the visual system, and a non-tracked visual system (Full Sphere). Column 402 represents the displays' pixel resolution. The movie resolution is an empirical number for 35-mm production film. These numbers also determine the aspect ratio of the device. Column 404 represents the displays' pixel size. This is the angular size of a single display pixel in minutes of arc. Column 406 represents the displays' total solid angle visual field of view (FOV) in units of steradians. Column 408 represents the maximum human-perceivable pixels within the field of view, assuming uniform 28 second of arc perception. This is simply the number of pixels of the size in column 404 that fit within the steradians of column 406. Column 410 represents the same information as the previous column, but for more practical 1.5 arc-minute perception pixels. Column 412 represents the maximum human-perceivable pixels within the field of view, assuming the variable resolution perception of FIGS. 17A–B. Column 414 represents the pixel limit of the display itself (multiplication of the numbers from column 402). Column 416 represents the number of perceivable pixels taking both the display and eye limits into account. This was computed by checking for each area within the display FOV that was the limit—the eye or the display, and counting only the lesser. Column 418 represents the limits of the previous column as maximum polygon rendering rates (in units of billions of polygons per second), using additional models developed further below.

To compute many of the numbers in FIG. 18, the unit sphere was broken up into 216 small sections, each with their own local maximum perceptible spatial frequency. Numerical integration was then performed on the intersection of these sections and the display FOV edges (or, in the case of the full eye, the edge of the visual field). The angular size of uniform pixels on a physically flat display is not a constant, i.e., the pixels will become smaller away from the axis. The effect is minor for most displays, but becomes quite significant for very large field of view displays. However, for simplicity this effect was not taken into account in the numbers in the table, as real display systems address this problem with multiple displays and/or optics.

There are several items of note in this table. The FOV of a single human eye is about one third of the entire 4π steradians FOV. A wide-screen movie is only a twentieth of the eye's FOV, and normal television is less than a hundredth. A hypothetical spherical display about a non-tracked rotating (in place) observer would need over two thirds of a billion pixels to be rendered and displayed (per eye) every frame to guarantee full visual system fidelity. An eye-tracked display would only require one forty-fifth as many rendered pixels, as the perception limit on the human eye is only about 15 million variable resolution pixels.

The Limits of Rendering

The following simple model provides one estimate of the maximum rendering rate that may be needed for a real-time system:

$$\Delta/\text{second} = \text{frame rate} \cdot (\text{number of eyes}) \cdot \text{screen pixels} \cdot \text{depth complexity} \cdot \Delta/\text{pixel}. \quad (18)$$

An empirical estimate of this last term is approximately one. The previous section developed estimates of screen pixels based on displays and perception. Frame rate has not been extensively discussed, other than an assumption that it is at or above 60 Hz. Very little is known about the interaction of rapidly-varying complex rendered images with the human visual system. Currently, a good approach is to pick a value that is estimated to be high enough. Some have even speculated that very high rendering frame rates (in excess of 300 Hz) may interact more naturally with the human visual system to produce motion blur effects than the traditional computer graphics techniques.

The pixels referenced in the table are assumed to be anti-aliased with a high quality resampling filter, either based on super-samples or area coverage techniques. The pixel counts in the table may be multiplied by the super-sampling density to obtain counts of samples rather than pixels. The polygon statistics touched only peripherally on depth complexity. However, assuming reasonable occlusion culling techniques, current experience is that depth complexity in many embodiments can be kept in a range of 3 to 6 in most (but by no mean all) cases. For purposes of example, a depth complexity of 6 is assumed. These assumptions were used to compute column 418 of the table using equation (18) (using two eyes for stereo displays). The numbers are in units of billions of polygons per second. Under these assumptions, the polygon rendering rate that will saturate the human visual system is:

$$60 \text{ Hz} \cdot 2 \text{ eyes} \cdot 14.78\text{M pixels} \cdot 6 \text{ DC} \cdot 1\Delta/\text{pixel} = 10.64\text{B } \Delta/\text{sec}. \quad (19)$$

This is just over ten billion polygons per second. For most traditional display devices, the saturation number is under half a billion polygons per second. The numbers presented here are neither theoretical minimum nor maximum calculations; they are conservative "average case" estimates, and changes in any of the assumptions can have a large effect on the results.

Log plots of cumulative statistics of screen space polygons may give useful insight into understanding the empirical behavior of polygons. This information can be used in making trade-offs in the design of real-time rendering hardware, and in the design of triangulated objects to be rendered in real-time. It was shown how these screen space statistics could be directly computed from their model space versions. These same functions can be used to define rendering performance functions in an architecture-independent manner, using the concept of false area. Refined versions of these performance functions can be used in managing the frame rate or controlling the quality of real-time rendering. Near-optimal visual quality is achieved when the median polygon is near a single pixel in size.

Figure 19A:
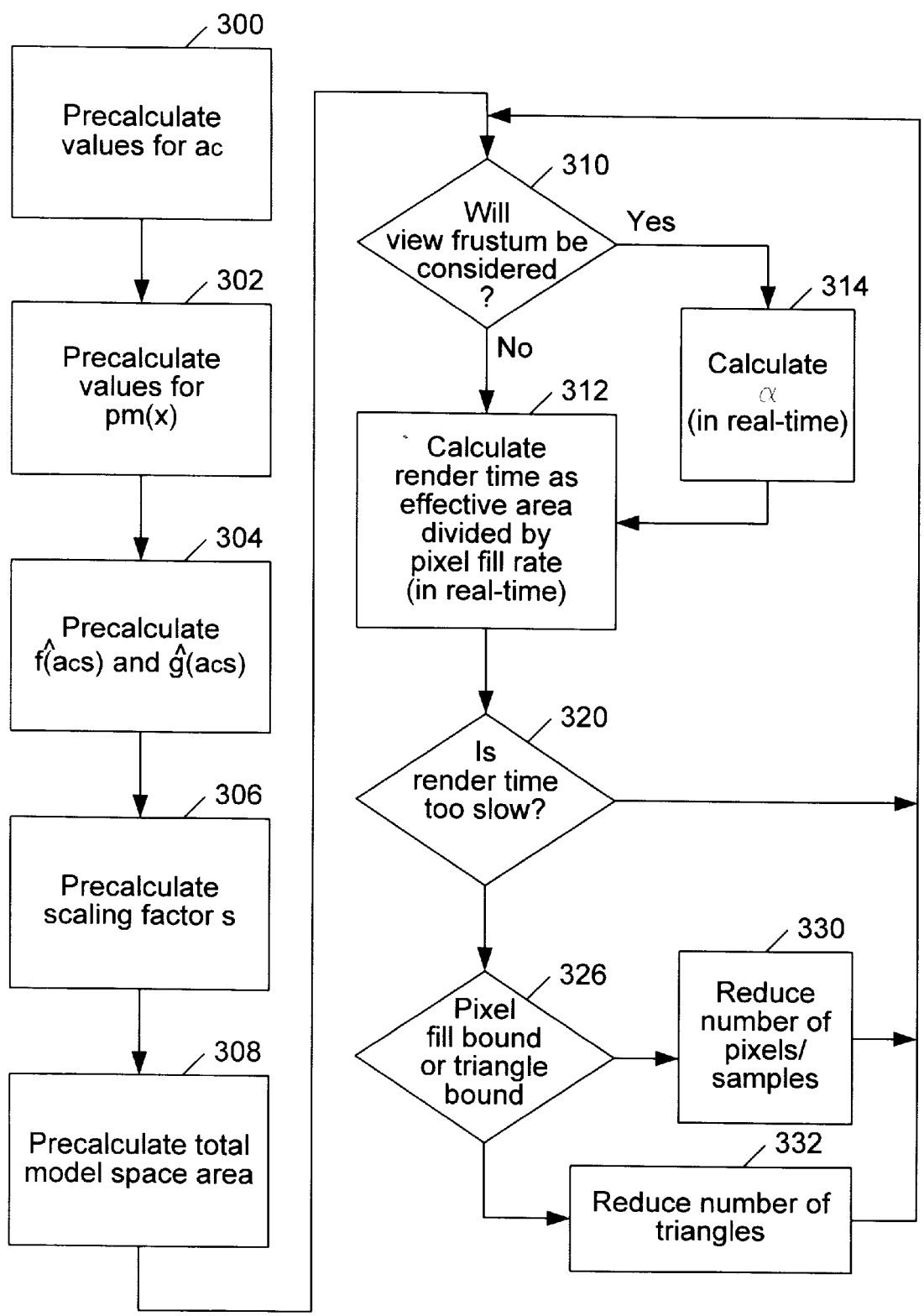
FIG. 19A is a flowchart illustrating one embodiment of a method for estimating performance limits.

Turning now to FIG. 19A, one embodiment of a method to efficiently calculate rendering speeds for sets of three-dimensional graphics data is shown. In this embodiment, a number of values from the equations outlined above are precalculated. Note while the flowchart illustrates these calculations being performed in a serial manner, they may also be performed in parallel or in a different order than that depicted in the figure. First, values for $a_c$, pm(x), $\hat{f}(a_c s)$, $\hat{g}(a_c s)$, s, and total model space are calculated (steps 300–308). Next, if view frustum culling is to be considered (step 300), then $\alpha$ is calculated in real-time or near real time (step 314). Then, the rendering time is calculated as the effective area divided by the pixel fill rate (step 312). As with optional step 314, step 312 may be performed in real-time or near real-time to allow frame-by-frame calculation of rendering times.

Next, the calculated rendering time is compared with the desired frame rate (step 320). If the calculated rendering time is fast enough to meet the predetermined minimum frame rate, then the graphics system may render the frame with the current parameters (step 322). If the calculated render time is too slow to meet the desired frame rate, equation (15) may be utilized to determine if the frame will be fill rate bound or polygon overhead bound (step 326). If the frame is polygon bound, then the graphics system may modify the rendering parameters to reduce the number of polygons (step 330). As previously described, this may be accomplished in a number of ways (e.g., by selecting a LOD with fewer polygons, or by dynamically tessellating the object into fewer polygons). If the frame is pixel fill bound, then the graphics system may be configured to modify the rendering parameters to reduce the number of pixels or samples (step 332). As previously described, this may also be accomplished in a number of different ways, including changing the number of samples calculated per pixel (in a super-sampled system) or by dynamically changing the size of the object or frame being rendered. Another alternative may be to discard certain background objects (e.g., those designated as less important by the software application that generated the frame).

This method may be implemented in hardware or software, or a combination thereof. The calculations may be performed on a per-frame basis (i.e., real-time), or on a less-frequent basis (near-real time), or offline. Some embodiments may perform all calculations in real-time, or, as described above, a number of values may be pre-calculated for a particular graphics data set with only the final calculations being performed in real-time. Still other embodiments may perform all calculations offline.

Figure 1B:
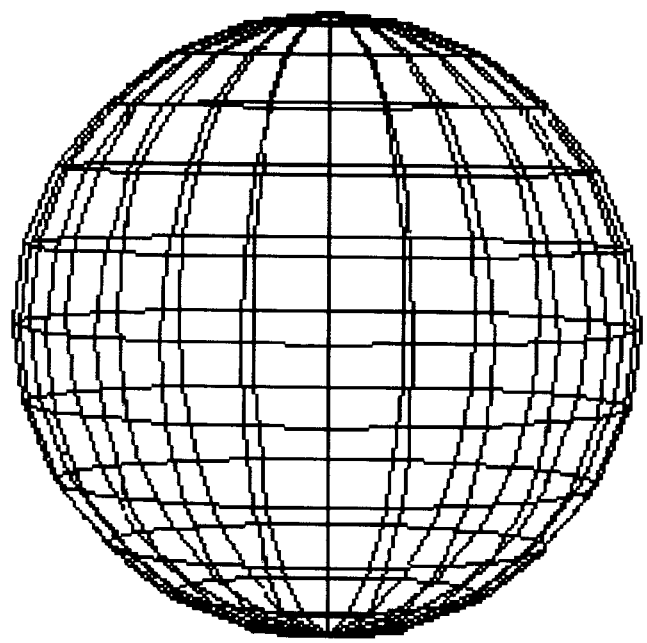
FIG. 1B illustrates a sphere tessellated using a higher number of polygons.

Turning now to FIG. 19B, one embodiment of a set of graphics data is shown. As the figure illustrates, in this example graphics data set 450 comprises a plurality of general objects 560A–C. Each general object in turn comprises a plurality of object variants 570. These object variants may themselves comprise a plurality of polygons and corresponding rendering attribute information (e.g., textures). The object variants may correspond to differing levels of detail (LOD), and may be selected before or during the rendering process to achieve a predetermined minimum frame rate (e.g., in step 332 of FIG. 19A). For example, object variant 576A may correspond to the sphere in FIG. 1B, while object variant 576B may correspond the sphere in FIG. 1A. Furthermore, object variant 576A may contain rendering attributes such as a marble texture that is to be texture mapped onto the sphere, while object valiant 576B may comprise a rendering attribute of simple shading with no texture. Some object variants may share the same polygons and may vary solely by rendering attributes. Similarly, other object variants may share the same rendering attributes and may vary by polygon count. Some general objects may have only one object variant, while others may have a large number of variants.

During rendering, the graphics system may be configured to calculate an estimated rendering time for each object variant of all general objects to be rendered and then select the most visually-realistic object variants consistent with a predetermined minimum frame rate. While the object variant selected for a particular general object may vary from frame to frame, the graphics system may consider a number of factors in selecting which object variant to render for a particular general object. For example, the graphics system may consider the general object's position. General objects that are in the background may be given a lower priority or importance and thus may have a faster-rendering object variant selected. In a flight simulator, for example, a general object corresponding to a tree in a forest in the background may be given less priority (making it more likely that the graphics system will select a faster-rendering, less visually-realistic object variant) than another general object corresponding to an enemy aircraft in the immediate foreground. The graphics system may also be configured to use hysteresis when selecting object variants. For example, assume object variant 576A had been selected for general object 560C for the previous 200 frames, and then performance limits forced the graphics system to select object variant 576B to maintain a predetermined minimum frame rate. After rendering object variant 576B for one frame, the graphics system may be configured to continue to select object variant 576B for the next few frames, even if the system's performance limits would allow it to select the more visually realistic object variant 576A. This hysteresis may advantageously prevent unwanted flickering that may occur if different object variants for a particular general object are selected in rapid succession.

Proof of Constancy of Projection

Assuming that a unit-area world-space polygon is viewed orthographically from a random viewpoint, then for the purposes of computing the projected area, only the angle between the polygon's facet normal and the view direction matters. The screen space area of the projected polygon for a given view will be just the cosine of the angle (the inner product of the normalized vectors). Thus, an equal probability distribution of all possible views is just a uniform distribution of directions. This can be represented as uniformly distributed points on a unit sphere. Without loss of generality, it suffices to only consider a hemisphere of points; as half the view directions will be back facing.

Points with the same inner product, and corresponding to views that will produce the same area, will all lie on the same latitude on the hemisphere. The "thickness" of lower latitudes exactly offsets the change in circumference, resulting in equal probabilities of view angles (thus areas).

Figure 20:
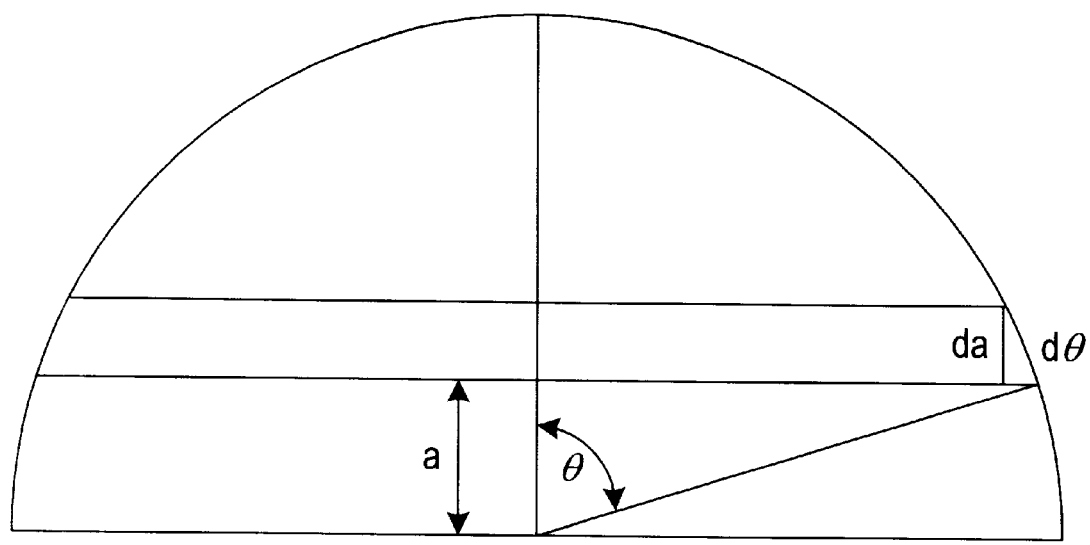
FIG. 20 is a diagram illustrating the proof of constancy of projection from model space to screen space.

FIG. 20 shows a cross section of this unit hemisphere. The measure of a band of constant height da at latitude θ is 2π≅sin θ≅dθ. However, dθ=da/(sinθ), so the sines cancel and the number of points in any band is independent of θ. Note however, that this constancy result may only hold in three dimensions.

Figure 21:
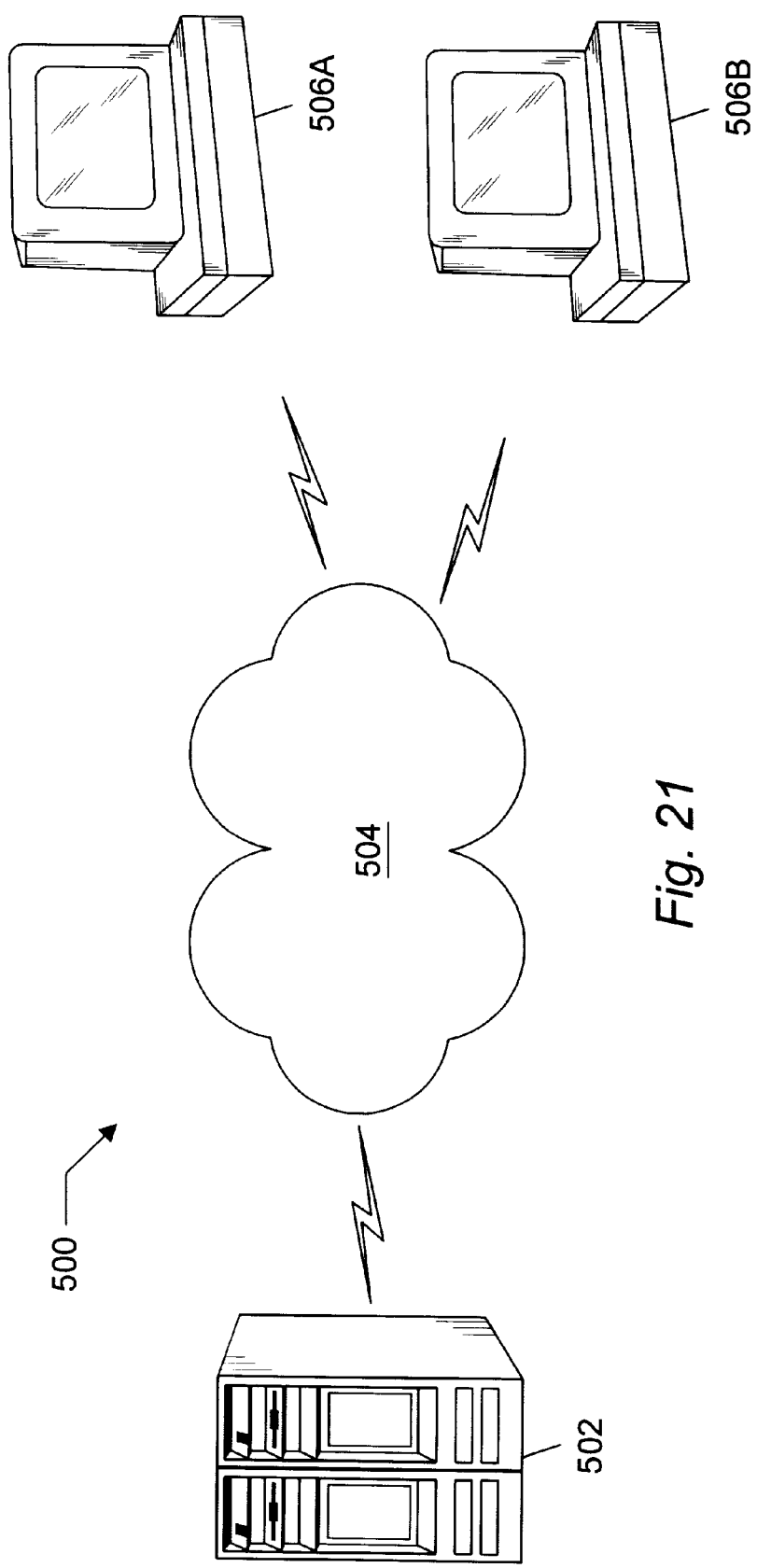
FIG. 21 is a diagram of one embodiment of a computer network connecting multiple computers.

Example Computer Network—FIG. 21

FIG. 21 illustrates an example computer network 500 comprising at least one server computer 502 and one or more client computers 506A–N (in the embodiment shown in FIG. 21, client computers 506A–B are depicted). One or more of the client systems may be configured similarly to computer system 80, each having one or more graphics systems 112 as described above. Each may further be configured to perform rendering time estimates as described above. Server 502 and client(s) 506 may be joined through a variety of connections 504, such as a local-area network (LAN), a wide-area network (WAN), or an Internet connection. In one embodiment, server 502 may store and transmit 3-D geometry data (which may be compressed) to one or more of clients 506. The clients 506 receive the 3-D geometry data, decompress it (if necessary), estimate the rendering time, and then render the geometry data (with modified rendering parameters as necessary). Note as used herein, rendering parameters comprise: the number of pixels or samples in the object/scene/image being rendered, the number of samples per pixel, the color depth, the texture parameters, the number of lights (and their corresponding properties), special rendering effects (e.g., transparency, anti-aliasing, fogging, blur effects), and the number of objects rendered. The rendered image is then displayed on the client's display device. The clients may render the geometry data and display the image using standard or super-sampled sample buffers as described above. In another embodiment, the compressed 3-D geometry data may be transferred between client computers 506.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A computer software program for estimating rendering times in a graphics system embodied on a carrier medium, wherein said software program is configured to estimate performance for a graphics system for polygon rendering, wherein said software program comprises a plurality of instructions configured to:
   calculate a rendering time for a set of graphics data; and, if the rendering time exceeds that specified by a predetermined minimum frame rate, then
      determine whether the graphics data is polygon overhead limited or pixel fill limited, and
      change rendering parameters accordingly to achieve said predetermined minimum frame rate;
   wherein said set of graphics data comprises a plurality of general objects, wherein each general object comprises a plurality of object variants, wherein each object variant comprises a plurality of polygons and rendering attributes;
   wherein said plurality of instructions are further configured to calculate a cumulative probability density distribution f(a) for at least one of the object variants, wherein f(a) is the probability of a randomly chosen polygon within the object variant having an area a or less.

2. The computer software program as recited in claim 1, wherein said plurality of instructions are further configured to calculate a cumulative area g(a) for all polygons in at least one of the object variants, wherein g(a) is the ratio of the amount of total surface area accounted for by polygons within the object variant having an area a or less over the total surface area of the object variant.

3. The computer software program as recited in claim 1, wherein said plurality of instructions are further configured to average f(a) over multiple different viewing angles.

4. The computer software program as recited in claim 1, wherein said plurality of instructions are further configured to:
   divide the possible viewpoints for one or more of the general objects into multiple different sets of viewing angles,
   calculate average values for f(a) for each different set of viewing angles, and
   select one value of the average values for f(a) based on the current viewpoint for use in calculating the rendering time.

5. The computer software program as recited in claim 4, wherein said multiple different sets of viewing angles overlap.

6. The computer software program as recited in claim 2, wherein said plurality of instructions are further configured to average g(a) over multiple different viewing angles.

7. The computer software program as recited in claim 2, wherein said plurality of instructions are further configured to calculate an aspect ratio for each polygon, wherein said aspect ratio for each polygon is the ratio of the polygon's height divided by the polygon's width.

8. The computer software program as recited in claim 7, wherein said plurality of instructions are further configured to calculate a skew for each polygon, wherein said skew for each polygon is the polygon's corner width divided by the polygon's width.

9. The computer software program as recited in claim 8, wherein f(a), g(a), the aspect ratio, and the skew are each calculated twice, once off-line in model space and once in real-time for screen space.

10. A computer software program for estimating rendering times in a graphics system embodied on a carrier medium, wherein said software program is configured to estimate performance for a graphics system for polygon rendering, wherein said software program comprises a plurality of instructions configured to:
   calculate a rendering time for a set of graphics data; and, if the rendering time exceeds that specified by a predetermined minimum frame rate, then
      determine whether the graphics data is polygon overhead limited or pixel fill limited, wherein the graphics data is polygon overhead limited when the graphics system's estimated performance is limited by per-polygon processing and pixel fill limited when the graphics system's estimated performance is limited by per-pixel calculations, and
      change rendering parameters accordingly to achieve said predetermined minimum frame rate, wherein said plurality of instructions are further configured to calculate rendering times for a plurality of different viewpoints for each object variant and then average the calculated rendering times for said plurality of different viewpoints for each object variant.

11. The computer software program as recited in claim 10, wherein said plurality of instructions are configured to calculate rendering times for all possible viewpoints for each object variant and then average the calculated rendering times.

12. The computer software program as recited in claim 11, wherein said plurality of instructions are configured to calculate rendering times for all possible viewpoints for the object variant by calculating rendering times for representative viewpoints for symmetrical portions of the object variant and averaging the calculated rendering times.

13. The computer software program as recited in claim 11, wherein said plurality of instructions are further configured to calculate and average the rendering times for all possible viewpoints for the object variant by performing a convolution calculation.

14. A computer software program for estimating rendering times in a graphics system embodied on a carrier medium, wherein said software program is configured to estimate performance for a graphics system for polygon rendering, wherein said software program comprises a plurality of instructions configured to:
calculate a rendering time for a set of graphics data; and, if the rendering time exceeds that specified by a predetermined minimum frame rate, then
determine whether the graphics data is polygon overhead limited or pixel fill limited, and
change rendering parameters accordingly to achieve said predetermined minimum frame rate, wherein said rendering time is calculated in real-time, and wherein a critical area $a_c$ is pre-calculated off-line.

15. The computer software program as recited in claim 14, wherein multiple values of $a_c$ are pre-calculated for different graphics systems and different rendering parameters.

16. The computer software program as recited in claim 14, wherein said rendering parameters are selected from the group consisting of: sample density, samples per pixel, number of pixels, lighting effects, number of light sources, level of detail, number of polygons, anti-aliasing, fogging, texture mapping parameters, programmable shaders, shading parameters, and color depth.

17. The computer software program as recited in claim 14, wherein said carrier medium is selected from the group consisting of: computer readable media and transmission media.

18. A method for modeling a graphics system's rendering performance for a particular set of geometry data, said method comprising:
determining the graphics system's pixel fill rate; and
calculating the graphics system's per-frame rendering time for the geometry data, wherein the geometry data comprises a plurality of polygons, wherein said per-frame rendering time is the effective area of the geometry data divided by the pixel fill rate, wherein the effective area equals the sum of the areas of all front-facing polygons in the geometry, wherein the area of each front-facing polygon in the geometry having an area less than a predetermined area $a_c$ is rounded up to the predetermined area $a_c$, and wherein said predetermined area $a_c$ is a constant describing the performance of the graphics system.

19. The method as recited in claim 18, wherein said per-frame rendering time further includes an adjustment for back facing polygons, wherein said adjustment is the number of back facing polygons multiplied by the predetermined area $a_c$.

20. The method as recited in claim 19, wherein said number of back-facing polygons is approximated with one half the total number of polygons in the frame.

21. The method as recited in claim 19, wherein said adjustment is further multiplied by the ratio of back-face processing times to minimal polygon rendering times.

22. The method as recited in claim 19, further comprising selecting a set of graphics data with a lower polygon count for rendering if said per-frame rendering rate falls below a predetermined minimum value and said graphics system performance is polygon overhead bound.

23. The method as recited in claim 19, further comprising causing said graphics system to reduce the pixel area of the graphics data if said per-frame rendering rate falls below a predetermined minimum value and said graphics system performance is fill rate bound.

24. The method as recited in claim 19, further comprising reducing the pixel area of the graphics data by video resizing if said per-frame rendering rate falls below a predetermined minimum value and said graphics system performance is fill rate bound.

25. The method as recited in claim 19, further comprising reducing the pixel area of the graphics data by deleting one or more background objects if said per-frame rendering rate falls below a predetermined minimum value and said graphics system performance is fill rate bound.

26. The method as recited in claim 19, further comprising reducing the sample density used to render at least part of the graphics data if said per-frame rendering rate falls below a predetermined minimum value and said graphics system performance is fill rate bound.

27. The method as recited in claim 19, further comprising reducing the pixel area of the graphics data by reducing the complexity of texture calculations performed on at least part of the graphics data if said per-frame rendering rate falls below a predetermined minimum value and said graphics system performance is fill rate bound.

28. The method as recited in claim 19, further comprising selecting a set of graphics data with a higher polygon count for rendering if said per-frame rendering rate rises above a predetermined maximum value and said graphics system performance is not polygon overhead bound.

29. The method as recited in claim 19, further comprising causing said graphics system to increase the pixel area of the graphics data if said per-frame rendering rate rises above a predetermined maximum value and said graphics system performance is not fill rate bound.

30. The method as recited in claim 19, further comprising increasing the pixel area of the graphics data by video resizing if said per-frame rendering rate rises above a predetermined maximum value and said graphics system performance is not fill rate bound.

31. The method as recited in claim 19, further comprising reducing the pixel area of the graphics data by deleting one or more background objects if said per-frame rendering rate rises above a predetermined maximum value and said graphics system performance is not fill rate bound.

32. The method as recited in claim 19, further comprising reducing the sample density used to render at least part of the graphics data if said per-frame rendering rate rises above a predetermined maximum value and said graphics system performance is not fill rate bound.

33. The method as recited in claim 19, further comprising reducing the pixel area of the graphics data by reducing the complexity of texture calculations performed on at least part of the graphics data if said per-frame rendering rate rises above a predetermined maximum value and said graphics system performance is not fill rate bound.

34. A method for predicting the approximate rendering time for a graphics system to render a particular set of geometry data, the method comprising:

determining a pixel fill rate for the graphics system;

calculating an effective area for the particular set of graphics data to be rendered; and estimating the geometry's render time in real time by dividing the effective area by the pixel fill rate;

wherein said calculating the effective area comprises:

calculating a real area for the set of geometry data, wherein said real area corresponds to the surface area of polygons in said geometry data that are equal to or above a predetermined constant $a_c$;

calculating a false area for the set of geometry data, wherein said false area approximates the effects of minimum polygon overhead and corresponds to the predetermined constant $a_c$ multiplied by the number of polygons in said geometry data that are smaller than the predetermined constant $a_c$; and summing said real area and said false area.

35. The method as recited in claim 34, wherein said calculating the real area comprises:

evaluating a function $\hat{g}(a_c s)$ that approximates the total surface area accounted for by polygons having areas less than or equal to the product of $a_c$ and s, wherein $a_c$ is a predetermined constant, and wherein s is a model space to screen space scaling factor that is assumed to be one for the calculation of $\hat{g}$;

calculating a total screen area for the set of geometry data;

calculating a model space to screen space scaling factor s; and multiplying said total area with $(1-\hat{g}(a_c s))$ performing numerical integration.

36. The method as recited in claim 34, wherein said calculating the false area comprises:

evaluating a function $\hat{f}(a_c s)$ that approximates the probability of a randomly selected polygon within the set of geometry data having an area less than or equal to the product of $a_c$ and s, wherein $a_c$ is a predetermined constant, and wherein s is a model space to screen space scaling factor; and determining a number n corresponding to the number of front-facing polygons in the set of geometry data; and computing a product false area product $(a_c \cdot n \cdot \hat{f}(a_c s)+1)$.

37. The method as recited in claim 36, wherein the term $a_c \cdot n$ is replaced with a term $r \cdot n$, wherein r is a ratio indicative of back-face processing times to minimal polygon rendering times.

38. The method as recited in claim 36, wherein the number n is assumed to be one half the total number of polygons in the geometry data set.

39. The method as recited in claim 36, wherein the total surface area of the geometry data is estimated by multiplying the pre-computed total model space area by s and dividing by two.

40. The method as recited in claim 34, wherein said estimating and said calculating are performed in real time and wherein said determining is performed off-line.

* * * * *